United States Patent
Fujii et al.

(10) Patent No.: US 8,417,424 B2
(45) Date of Patent: Apr. 9, 2013

(54) CONTROL SYSTEM FOR WORKING MACHINE

(75) Inventors: Yasuo Fujii, Habikino (JP); Tetsuya Nakajima, Osaka (JP); Tamaki Naka, Sakai (JP); Shigeki Hayashi, Sakai (JP); Yukifum Yamanaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/532,536

(22) PCT Filed: Sep. 12, 2008

(86) PCT No.: PCT/JP2008/066541
§ 371 (c)(1),
(2), (4) Date: Jan. 26, 2010

(87) PCT Pub. No.: WO2009/081631
PCT Pub. Date: Jul. 2, 2009

(65) Prior Publication Data
US 2010/0114451 A1      May 6, 2010

(30) Foreign Application Priority Data

Dec. 26, 2007  (JP) .................... 2007-334499
May 30, 2008  (JP) .................... 2008-143280

(51) Int. Cl.
*G06F 7/00*      (2006.01)
(52) U.S. Cl. ................................... 701/50
(58) Field of Classification Search ............ 701/50, 701/93, 99, 103, 104, 123
See application file for complete search history.

(56) References Cited

U.S. PATENT DOCUMENTS 6,230,089 B1    5/2001  Lonn et al.
2003/0033067 A1    2/2003  Arita et al.
2005/0120281 A1    6/2005  Takatori et al.

FOREIGN PATENT DOCUMENTS

| DE | 10 2004 055 950 A1 | 6/2005 |
|---|---|---|
| EP | 1655469 A1 | 5/2006 |
| JP | 08-074643 A | 3/1996 |
| JP | 10-337109 A | 12/1998 |
| JP | 2001-120033 A | 5/2001 |
| JP | 2002-180870 | * 6/2002 |
| JP | 2002-180870 A | 6/2002 |
| JP | 2003-058285 A | 2/2003 |
| JP | 2005-059773 A | 3/2005 |
| JP | 2005-149401 A | 6/2005 |
| JP | 2006-348889 | * 12/2006 |
| JP | 2006-348889 A | 12/2006 |
| JP | 2007244207 A | 9/2007 |

OTHER PUBLICATIONS

Supplementary European Search Report dated Oct. 27, 2011; Kubota Corporation; Reference: P25206EP/SPC/JX.

* cited by examiner

*Primary Examiner* — Kim T Nguyen
(74) *Attorney, Agent, or Firm* — The Webb Law Firm

(57) ABSTRACT

A plurality of control units capable of communicating with each other via a data communication network (TU) are disposed in distribution. One of the plurality of control units is set as an information management control unit (H1) having writable nonvolatile storing means. Upon activation with power supply thereof, the information management control unit (H1) executes a control management information distributing process for transmitting control management information stored in a memory (50) to storage object control units (H2-H6) via the communication network (TU). Upon activation with power supply thereto, each of the storage object control units (H2-H6) executes a control management information obtaining process for obtaining the control management information transmitted from the control management information control unit (H1).

3 Claims, 19 Drawing Sheets

CONTROL SYSTEM FOR WORKING MACHINE

TECHNICAL FIELD

The present invention relates to a control system for a working machine comprising: a plurality of control units disposed in distribution to be capable of communicating with each other via a data communication network, each one of the plurality of control units controlling a controlled object assigned thereto, based upon input information inputted by information inputting means included in this unit, control information communicated from a further control unit, and control management information.

BACKGROUND ART

With the above-described control system for a working machine, each one of the plurality of control units controls a controlled object assigned thereto. Various kinds of information such as the input information inputted by the information inputting means provided in one control unit and information indicative of a control condition of the controlled object can be utilized for controlling in a further control unit. And, such information is transmitted as the control information from the one control unit to the further control unit via the data communication network. Further, when the control unit controls the controlled object assigned thereto, the unit uses the control management information. As one example of this control management information, the following data can be cited. That is, a control unit having an actuator as the controlled body capable of moving an operated object and a potentiometer type detecting sensor for detecting an operational position of the operated object uses fine adjustment data for adjusting individual difference in the detection values of the detecting sensor when the controlled body operated by the actuator is operated to a reference position. These fine adjustment data represent an example of the above data.

As a conventional example of such control system for a working machine, from JP-A-2005-059773 (Patent Document 1), there is known a system wherein each one of the plurality of control units includes a writable nonvolatile memory (EEPROM) for storing the control management information for use in each control unit.

The control management data such as the fine adjustment data described above are generally determined in advance and stored in the memory, prior to shipment of the working machine from the manufacturing factory. And, if a trouble develops in the detecting sensor or the actuator with use of the working machine, a maintenance operation is effected on this sensor or actuator. In this case too, determination of data and writing thereof into the memory are to be effected again. Therefore, in order to allow rewriting of the control management information and also to avoid inadvertent deletion of the stored information upon stop of power supply, the control management information is stored in the writable nonvolatile memory.

According to the above-described conventional technique, each one of the plurality of control units is equipped with the writable nonvolatile memory for storing the control management information, through which the control unit can control the assigned controlled object appropriately. However, since each one of the plurality of control units is equipped with the memory as described above, a large number of writable nonvolatile memories are required.

Patent Document 1: Japanese Patent Application "Kokai" No. 2005-059773 (JP-A-2005-059773).

DISCLOSURE OF INVENTION

The object of the present invention is to provide a control system which not only allows each one of the plurality of control units to control a controlled object assigned thereto appropriately, but allows simplification and cost reduction of the system through reduction in the number of writable nonvolatile memories.

The above object is fulfilled, according to one aspect of the invention as under:-

A control system for a working machine comprising: a plurality of control units disposed in distribution to be capable of communicating with each other via a data communication network, each one of the plurality of control units controlling a controlled object assigned thereto, based upon input information inputted by information inputting means included in this unit, control information communicated from a further control unit, and control management information;

wherein said plurality of control units are composed of an information management control unit and storage object control units separate from the information management control unit, the information management control unit having a writable nonvolatile memory for storing the control management information of the storage object control units as well as the control management information of this the information management control unit;

upon activation by power supply thereto, said information management control unit executes a control management information distributing process for transmitting the control management information stored in the memory to said storage object control units via the data communication network; and upon activation by power supply thereto, each one of said storage object control units executes a control management information obtaining process for receiving the control management information for its own transmitted from said information management control unit via said data communication network.

That is to say, any one of the plurality of control units is set as the information management control unit and includes a writable nonvolatile memory for storing the control management information. And, this memory stores therein control management information for its own, i.e. for this information management control unit, as well as the control management information for all or some of the other control units of the plurality of control units other than the information management control unit, i.e. for the storage object control units.

And, upon activation with supply thereto, the information management control unit transmits the control management information stored in the memory thereof to the storage object control units, so that each one of these storage object control units, upon activation with power supply thereto, receives the control management information for its own, transmitted from the information management control unit via the data communication network.

That is to say, the control management information of the plurality of control units as the storage object control units, can be stored in the writable nonvolatile memory included in one of the plurality of control units. So, there is no need to provide the writable nonvolatile memory in each and every one of the plurality of control units. Hence, for the system as a whole, the number of writable nonvolatile memories can be reduced correspondingly. Moreover, each one of the storage object control units, upon activation with power supply, can obtain the control management information needed for itself, so that by using this obtained control management information, the unit can appropriately control the controlled object assigned thereto.

Therefore, with the above-described construction, each control unit can appropriately control a controlled object assigned thereto, and also the reduction of the number of writable nonvolatile memories can be realized. As a result, it has become possible to provide a control system for a working machine, which allows simplification and cost reduction.

According to one preferred embodiment of the present invention:- said information management control unit executes said control management information distributing process until lapse of a predetermined management setting period after the activation with power supply, and after the lapse of said management setting period, said information management control unit executes a control information communicating process for transmitting/receiving said control information; and each one of said storage object control units executes said control management information obtaining process until lapse of the predetermined management setting period after the activation with power supply, and after the lapse of said management setting period, said storage object control units executes a control information communicating process for transmitting/receiving said control information.

That is to say, the information management control unit executes the control management information distributing process until lapse of a predetermined management setting period after the activation with power supply, and each one of said storage object control units executes the control management information obtaining process until lapse of the predetermined management setting period after the activation with power supply. Therefore, during the period from activation with power supply to the lapse of the predetermined management setting period, each control unit can communicate the control management information in a concentrated manner. And, after the lapse of the predetermined management control period, each one of the storage object control units, having obtained the control management information appropriately, can execute the control information communicating process.

Therefore, with effective utilization of the period immediately after the power supply, the control management information can be communicated in a concentrated manner, so that it has become possible to provide a control system capable of effecting control operations as a whole.

According to one preferred embodiment of the present invention:- said control management information includes a plurality of kinds of control management information;

in said control management information obtaining process, said each storage object control unit transmits a plurality of kinds of request information according to a predetermined sequence, said plurality of kinds of request information requesting said plurality of kinds of control management information respectively; and in said control management information distributing process, when said information management control unit is transmitting said plurality of kinds of control management information according to the predetermined sequence, if none of the plurality of storage object control units is transmitting any request information requesting any one of the plurality kinds of control management information, said information management control unit transmits the kind of control management information in the subsequent order in the predetermined sequence.

That is to say, for the communication of the plurality of kinds of control management information, the storage object control unit transmits request information requesting the kind of control management information in the first order in the sequence and the information management control unit first transmits this kind of control management information in the first order. Upon receipt of this kind of control management information in the first order, the storage object control unit will transmit request information requesting a kind of control management information in the subsequent order in the sequence. In this, if any one of the plurality of storage object control units is requesting this kind of control management information, the information management control unit will transmit this kind of control management information. If none of the plurality of storage object control units is transmitting the request information requesting this kind of control management information, then, the kind of control management information in the subsequent order will be transmitted.

And, with repeated execution of the above-described processes, when any of the storage object control units is not receiving any kind of control management information of the plurality of kinds of control management information, the information management control unit effects transmission of that kind of control management information. So, each one of the plurality storage object control units can receive the plurality of kinds of control management information requested from this unit, and all the storage object control units can receive the plurality of kinds of control management information respectively.

Therefore, according to this construction, it has become possible to provide a control system for a working machine that allows reliable communication of each one of the plurality of kinds of control management information to the plurality of storage object control units.

According to one preferred embodiment of the present invention:- if each one of the storage object control units does not receive the requested kind of control management information in the control management information obtaining process, the storage object control unit transmits repeatedly the request information corresponding to that kind of control management information upon lapse of a predetermined unit period.

That is, if each one of the storage object control units does not receive the requested kind of control management information, the storage object control unit transmits repeatedly the request information corresponding to that kind of control management information upon lapse of a predetermined unit period. Therefore, the information management control unit can judge repeatedly upon lapse of the predetermined unit period, which kind of control management information is requested by the plurality of storage object control units. Then, the plurality of kinds of control management information can be transmitted in a reliable manner with reduced risk of omission of transmission. Consequently, the plurality of storage object control units can reliably receive the plurality of kinds of control management information.

Therefore, according to the above characterizing feature, it has become possible to provide a control system for a working machine with which the information management control unit can transmit the plurality of kinds of control management information in a reliable manner and the plurality of storage object control units can receive each one of the plurality of kinds of control management information in a reliable manner.

According to one preferred embodiment of the present invention:- the storage object control unit includes a ROM (read-only-memory) for storing alternative control management information; and if the storage object control unit fails to receive the control management information for its own to be transmitted from the information management control unit even after the lapse of said management setting period, the storage object control unit controls the controlled object assigned thereto, based on the alternative control management information stored in said ROM.

That is, if the storage object control unit does not receive the control management information for its own even after lapse of the management setting period, the storage object control unit controls the controlled object assigned thereto based on the alternative control management information stored in the ROM provided therein. Therefore, even in the event of communication abnormality such as a trouble or communication error in the data communication network, it is possible to avoid the storage object control unit being shifted into the state for controlling the controlled object assigned thereto without obtaining the control management information. And, in this case, the storage object control unit can control the controlled object assigned thereto, based on the alternative control management information.

Referring further to the alternative control management information, in the case of fine adjustment data as an example of the control management information, a standard value which is an intermediate value in the range of dispersion due to individual differences among a plurality of working machines can be used as the alternative control management information, for example.

With this construction, there can be provided a control system for a working machine wherein even in the event of communication abnormality or trouble, the storage object control unit can control the controlled object assigned thereto with using the control management information.

According to one preferred embodiment of the present invention:- a specified storage object control unit among the storage object control units includes a writable nonvolatile memory for storing the control management information for its own; and said specified storage object control unit stores in said nonvolatile memory the control management information for its own transmitted by said control management information obtaining process; and if the control management information for its own to be transmitted from the information management control unit is not received even after the lapse of said management setting period, the controlled object assigned thereto is controlled based on control management information stored in said nonvolatile memory.

That is to say, the specified storage object control unit stores in the nonvolatile memory the control management information for its own transmitted by the control management information obtaining process. In this way, after storage of the control management information, if the control management information for its own to be transmitted from the information management control unit is not received even after lapse of the management setting period, the controlled object assigned thereto is controlled, based upon the control management information stored in the nonvolatile memory. Therefore, even in the event of communication trouble such as a trouble or communication error in the data communication network, the controlled object assigned thereto can be controlled appropriately, based upon the control management information stored in the memory.

That is to say, if a control unit to be assigned with an especially important control among the plurality of control units is set as the specified storage object control unit to store the control management information in its nonvolatile memory, it becomes possible to store the control management information in an overlapped manner in each one of the nonvolatile memories provided in each information management control unit and the specified storage object control unit. Hence, when communication from the information management control unit is disabled due to communication abnormality or the like, appropriate control management information can be obtained with using the stored contents of the nonvolatile memory included in the specified storage object control unit, so that the controlled object assigned thereto can be controlled favorably.

Hence, it is possible to provide a control system for a working machine with which even in the event of occurrence of communication trouble in the data communication network, as the control management information is stored in the nonvolatile memory provided in the specified storage object control unit, the controlled object can be controlled appropriately.

According to one preferred embodiment of the present invention:- said specified storage object control unit includes a ROM for storing alternative control management information; and when control management information for its own is not stored in the ROM provided in the specified storage object control unit, if the control management information for its own cannot be received from said information management control unit even after lapse of said management setting period, the controlled object assigned thereto is controlled based on the alternative control management information stored in said ROM.

That is to say, when the control management information is not stored in the nonvolatile memory provided in the specified storage object control unit, if the control management information for its own cannot be received from the information management control unit even after lapse of the management setting period, the specified storage object control unit controls the controlled object assigned thereto based on the alternative control management information stored in the ROM. Therefore, even when the control management information for its own is not stored in the nonvolatile memory provided in the specified storage object control unit, in the event of communication trouble such as a trouble or communication error in the data communication network, the controlled object assigned thereto can be controlled based upon the alternative control management information.

Therefore, it has become possible to provide a control system for a working machine with which by adopting the double safety measure of storing the control management information in the nonvolatile memory provided in the specified storage object control unit and storing control management information in the ROM (read-only-memory), the control of the controlled object can be effected in even more reliable manner, in the event of communication trouble in the data communication network.

According to one preferred embodiment of the present invention:- said control management information includes information relating to the model type of the working machine.

That is to say, since the control management information includes information relating to the model type of the working machine, each one of the plurality of storage object control units can effect appropriate control according to the model type of the working machine mounted.

More particularly, in many cases, the basic contents of control executed by the plurality of control units to be provided in a working machine remain the same regardless of the model type, whereas additional control contents to be added to the basic control contents differ according to the working machine model type. Then, as the plurality of control units include a plurality of kinds of additional control contents to be able to cope with a plurality of model types of working machines and store the information of the model types in the nonvolatile memory, once the model type information is given, control according to that working machine mode type can be effected.

Further, in case the working machine model type information is stored as the alternative control management information, the information of only the basic control contents described above is to be stored, so that the contents can be used commonly by any model type of working machine.

Therefore, it has become possible to provide a control system for a working machine with which cost reduction is made possible by sharing the information by/among different model types of working machines.

According to one preferred embodiment of the present invention:- said working machine includes an actuator acting as said controlled object capable of moving a controlled body; and a potentiometer type detecting sensor acting as said information inputting means for detecting an operated position of said controlled body;

said storage object control unit controls said actuator based on detection information of said detecting sensor, and communicates as said control management information, to said information management control unit, fine adjustment data for adjusting individual difference in detection value of the detecting sensor when said controlled body is operated to a reference position by said actuator.

That is to say, as the control management information, fine adjustment data for adjusting individual difference in the detecting sensor detection value when said controlled body is operated to a reference position by the actuator, can be stored in the nonvolatile memory; and the storage object control unit, when effecting the control of movement of the controlled body by the actuator, can detect the operated position of the controlled body by the detecting sensor as an appropriate value taking the individual difference into consideration, with using the fine adjustment data communicated from the information management control unit.

Therefore, there can be realized a control system for a working machine that allows the storage object control unit to effect appropriately the control, through activation of the actuator based on detection information of the detecting sensor.

According to one preferred embodiment of the present invention:- said storage object control unit executes a fine adjustment data obtaining process for updating said fine adjustment data; and when updating fine adjustment data are obtained by this fine adjustment data obtaining process, these fine adjustment data are communicated to said information management control unit.

That is to say, as the storage object control unit executes the fine adjustment data obtaining process, fine adjustment data for updating can be obtained. For instance, if repair/replacement has been made due to a trouble developed in the detecting sensor for detecting control management information, new fine adjustment data corresponding to a detection condition after that repair/replacement can be obtained. Then, when the new fine adjustment data have been obtained by this fine adjustment data obtaining process, this fine adjustment data will be communicated to the information management control unit, so as to be written in the writable nonvolatile memory. After the storage of the new fine adjustment data in this way, the storage object control unit can receive, by communication, the new fine adjustment data from the information management control unit.

Therefore, there can be realized a control system for a working machine, with which even when a repair/replacement has been done due to e.g. a trouble developed in the detecting sensor, the storage object control unit can receive appropriate fine adjustment data from the information management control unit and can effect its control through an operation of the actuator based on the detection information of the detecting sensor.

According to one preferred embodiment of the present invention:- the system further comprises an engine control unit for controlling an engine mounted on a work vehicle as said working machine, said engine control unit being provided separately from said information management control unit and said storage object control unit;

said information management control unit communicates to said engine control unit as said control information, control switchover instructing information, target rotational speed information and accelerator operational amount information; and based on said control switchover instructing information communicated from said information management control unit, said engine control unit is switchable between a state for executing an isochronous control for maintaining an output rotational speed of the engine at a target rotational speed and a state for executing a droop control for adjusting the output rotational speed of the engine to a speed corresponding to an accelerator operational amount.

That is to say, from the information management control unit to the engine control unit, there are communicated control switchover instructing information, a target rotational speed information and an accelerator operational amount information. And, based upon the control switchover instructing information, the engine control unit is switched over between the state for executing the isochronous control and a state for executing the droop control.

In the state for executing the isochronous control, the engine control unit controls the engine to maintain its output rotational speed at a target rotational speed communicated from the information management control unit. If the engine is maintained at the target rotational speed in this manner, when a work is to be carried out by driving the implement, this work can be done in favorable manner with the stable rotational speed. For instance, if a combine is employed as the working machine, a harvesting operation can be carried out favorably at a stable rotational speed.

In the state for executing the droop control, the engine control unit controls the engine to adjust its output rotational speed to a speed corresponding to an accelerator operational amount communicated from the information management control unit. If the speed is adjusted to the speed corresponding to the accelerator operational amount in this way, the engine can be controlled at a rotational speed as desired by the operator. For instance, if a combine is employed as the working machine, it can be caused to travel at an appropriate rotational speed adjusted by a manual adjustment, in the case of traveling on a road.

Therefore, it has become possible to provide a control system for a working machine that allows controlling an engine to an appropriate rotational speed according to a use condition of the working machine.

BEST MODE FOR CARRYING OUT THE INVENTION

Next, with reference to the accompanying drawings, there will be described an embodiment in which the control system of the invention is applied to a combine as an example of the working machine.

Figure 1:
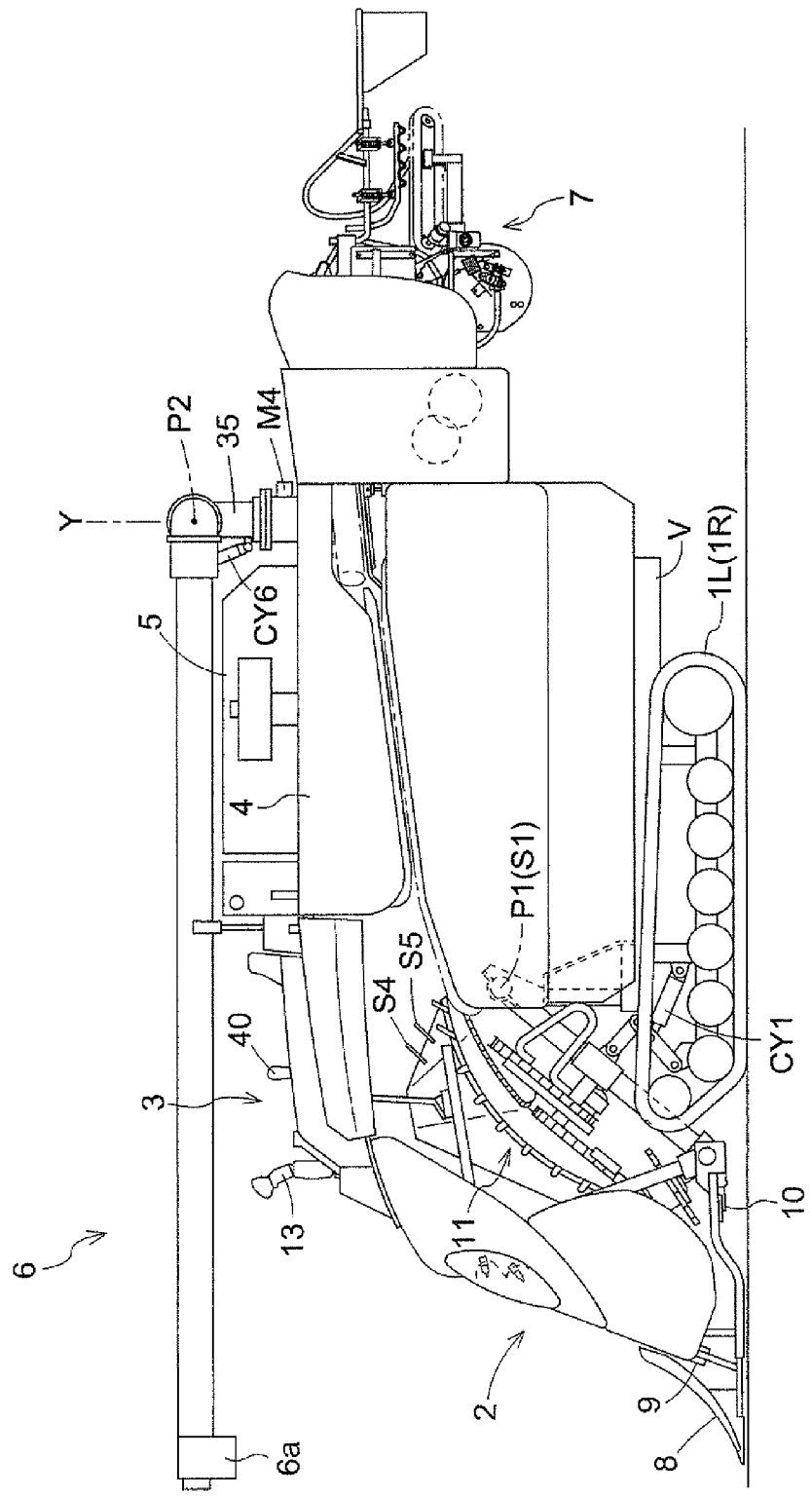
FIG. 1 is an overall side view of a combine using a control system according to the present invention.

As shown in FIG. 1, in this combine, to a front portion of a machine body V having a pair of right and left crawler type traveling devices 1R, 1L, there is attached a harvesting section 2, with this section 2 being vertically pivotable about a horizontal axis P1 by means of a harvesting lift cylinder CY1 as an actuator. Rearwardly of this harvesting section 2, there are mounted an operational section 3, a threshing section 4 for threshing/sorting harvested culms, a grain tank 5 for reserving therein grains to be fed from the threshing section 4, a grain discharging unloader 6 for discharging the grains from within the grain tank 5, a bundling device 7 for bundling waste straws after the threshing by a predetermined amount and discharging the bundled straws to the outside of the machine, etc.

The harvesting section 2 includes a grass divider 8 attached to the leading end thereof, a culm raiser 9, a cutting blade 10 for cutting the roots of the raised culms and a conveying device 11 for receiving the harvested culms adjacent the leading end thereof and then conveying them to the threshing section 4. Further, a potentiometer type harvesting lift position sensor S1 is provided for detecting the lift position of the harvesting section 2 relative to the machine body V based on a pivot angle about the horizontal axis P1.

Figure 10:
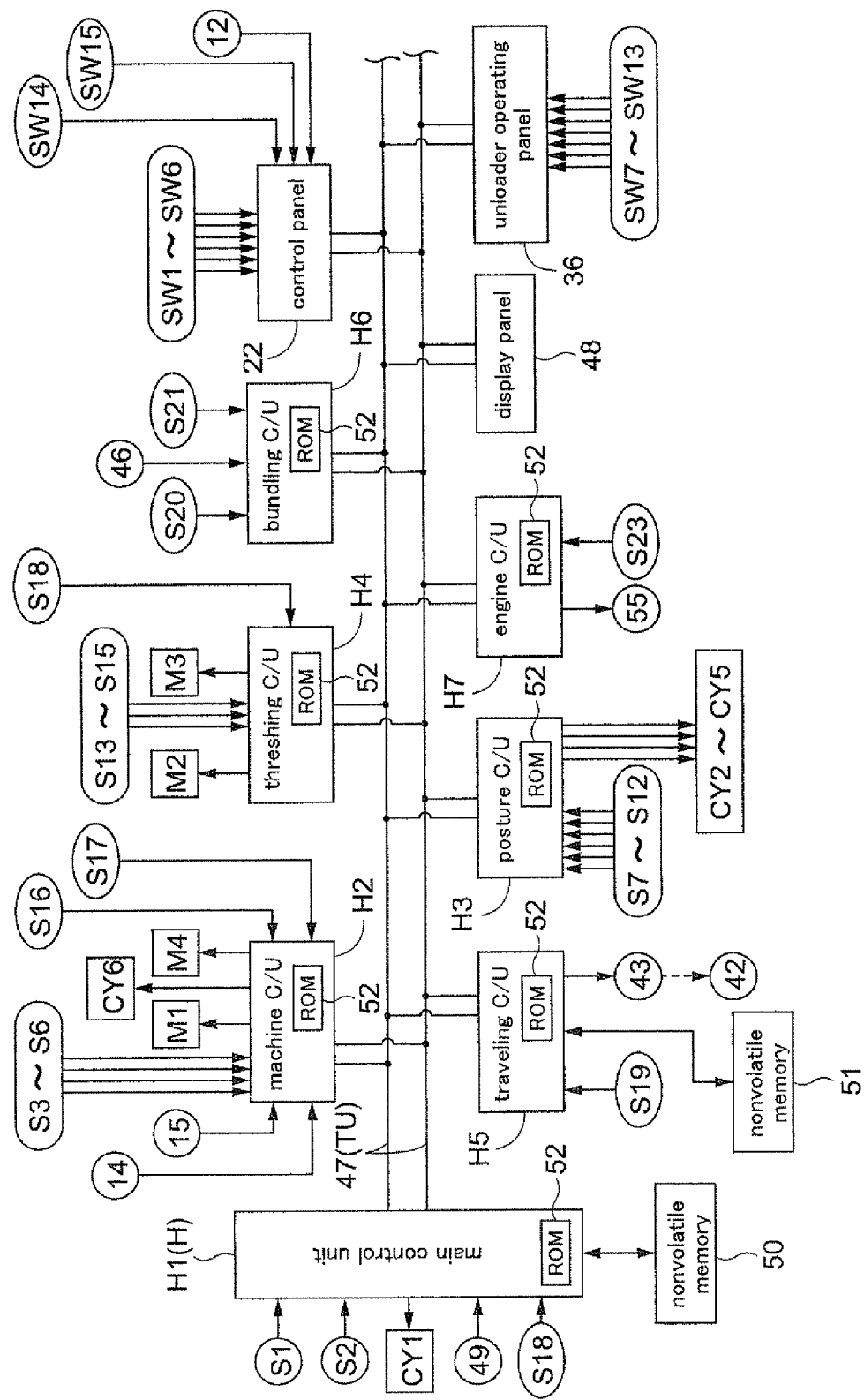
FIG. 10 is a control block diagram of the combine.

Further, the harvesting section 2, as shown in FIG. 10, includes a ground-contacting type harvesting height sensor S2 for detecting a height of the harvesting section 2 as measured from the ground surface, and a stock root sensor S3 activated upon contact with harvested culms to detect that a harvesting operation is going on. The operational section 3 includes a harvesting height setter 12 for setting a target harvesting height. The information detected by the harvesting height sensor S2 on the height of the harvesting section 2 from the ground surface is used for harvesting height control in harvesting culms. More particularly, when harvesting control is started with the provision of the lift position of the harvesting section 2 relative to the machine body V being lower than a predetermined position, the harvesting lift cylinder C1 will be controlled such that the detection value of the harvesting height sensor S2 may be rendered to a target harvesting height set by the harvesting height setter 12.

As shown in FIG. 1, the operating section 3 includes a cross-operation type harvesting height steering 13 acting as a harvesting lift lever for manually lifting up/down the harvesting section 2 and acting also as a steering lever for manually steering the traveling machine body to the right/left. In operation, when this harvesting height steering lever 13 is pivoted to the rear side, an elevating switch 14 (see FIG. 10) is turned ON to elevate the harvesting section 2. When the lever 13 is pivoted to the forward side, a lowering switch 15 (see FIG. 10) is turned ON to lower the harvesting section 2.

Figure 3:
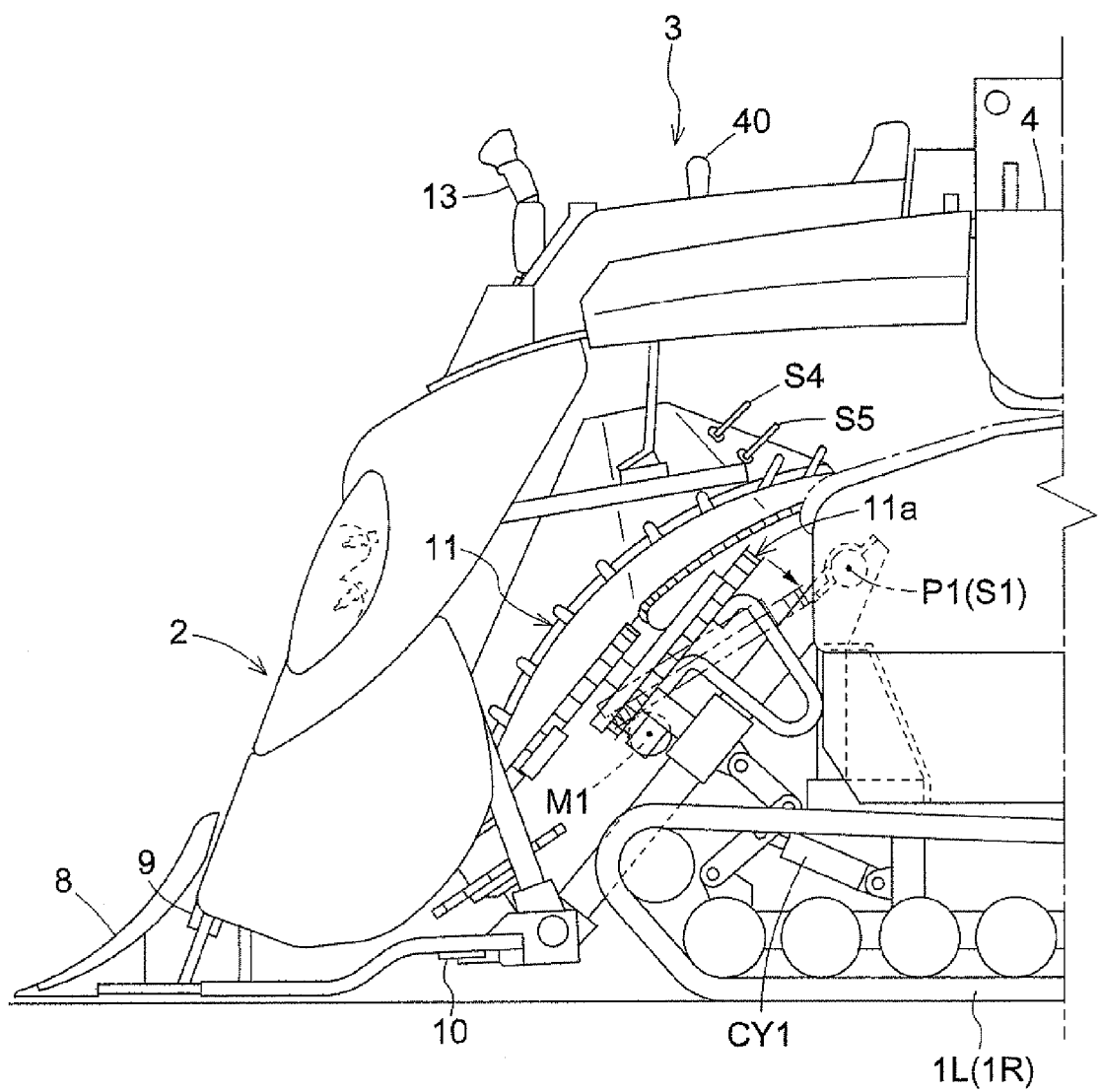
FIG. 3 is a side view showing a front portion of the combine.

As shown in FIG. 3, the conveying device 11 supports a conveying section 11a disposed at the conveying terminal end thereof, with the section 11a being pivotable about a vertical axis and pivotally adjustable by means of a threshing depth motor M1 as an actuator. Further, an ear-tip side culm sensor S4 for detecting the ear tip position of the conveyed culms and a root side culm sensor S5 are provided with positional offset relative to each other in the culm length direction. Then, by changing the delivering position by the conveying section 11a to the threshing section 4 along the culm length direction to an appropriate condition that the ear tips of the conveyed culms may be located between these two sensors S4, S5, the threshing depth at the threshing section 4 can be adjusted and the threshing depth at the threshing section 4 can be maintained under the proper condition. Further, there is provided a rotational potentiometer type threshing depth position sensor S6 (see FIG. 10) for detecting the threshing depth adjusted position provided by the threshing depth sensor M1.

Figure 4:
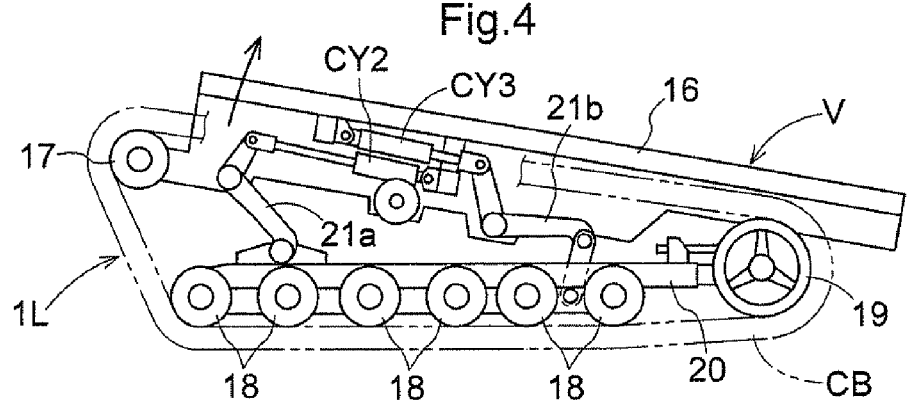
FIG. 4 is a side view of a traveling device of the combine.

Referring to the left-side traveling device 1L as shown in FIG. 4, on the front end side of a fore/aft oriented main frame 16 constituting the machine body V, a drive sprocket 17 is rotatably mounted. A track frame 20, pivotally mounting a plurality of free wheels 18 in juxtaposition in the fore/aft direction and a tension wheel 19 supported at the rear end thereof for tensioning a crawler belt CB, is connected to be vertically pivotable to the main frame 16 by means of a front bell crank 21a and a rear bell crank 21b. More particularly, a lower end portion of the front bell crank 21a is pivotally connected to a front portion of the track frame 20, and a lower end portion of the rear bell crank 21b is pivotally connected to a rear portion of the track frame 20. On the other hand, to upper end portions of the respective front and rear bell cranks 21a, 21b, there are operably connected cylinder rods of a pair of hydraulic cylinders CY2, CY3 having cylinder bodies thereof pivotally connected to the main frame 16. The right-side traveling device 1R has an identical construction.

Accordingly, as actuators, there are provided four hydraulic cylinders, i.e. the left front cylinder CY2 for lifting up/down the front portion of the left traveling device 1L the left rear cylinder CY3 for lifting up/down the rear portion of the left traveling device 1L, the right front cylinder CY4 for lifting up/down the front portion of the right traveling device 1R and the right rear cylinder CY5 for lifting up/down the rear portion of the right traveling device 1R. In operation, by expanding/contracting these four hydraulic cylinders CY2-CY5, the fore/aft inclination angle and the right/left inclination angle of the machine body V relative to the ground surface can be changed. And, four potentiometer type stroke sensors S7-10 are provided for detecting lift operational amounts by the respective cylinders CY2-CY5.

Figure 5:
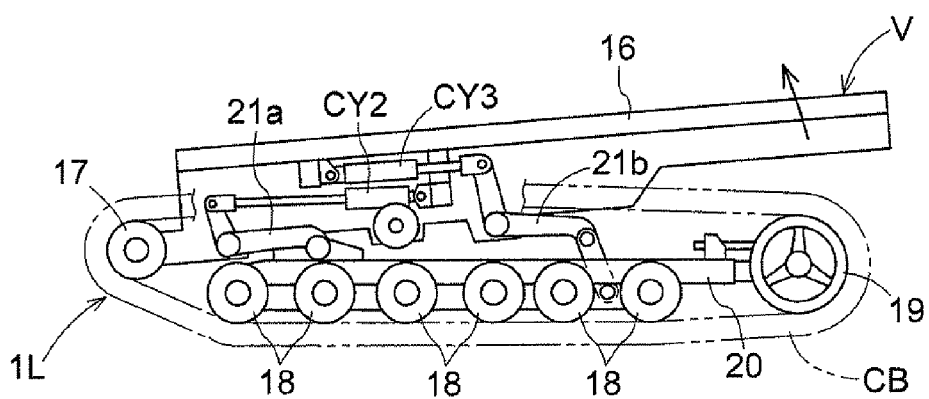
FIG. 5 is a side view of the traveling device of the combine.
Figure 6:
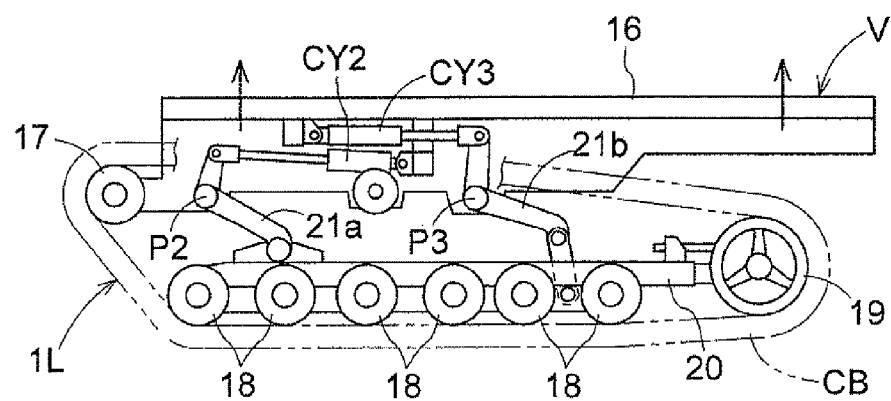
FIG. 6 is a side view of the traveling device of the combine.

That is to say, as shown in FIGS. 4 and 5, if e.g. the left front cylinder CY2 and the right front cylinder CY4 are stopped and the left rear cylinder CY3 and the right rear cylinder CY5 are expanded/contracted simultaneously, the fore/aft inclination angle of the machine body relative to the ground surface is changed. Further, as shown in FIG. 6, if the right front cylinder CY4 and the right rear cylinder CY5 are stopped and the left front cylinder CY2 and the left rear cylinder CY3 are expanded/contracted simultaneously, the right/left inclination angle of the machine body relative to the ground surface is changed.

And, the machine body V, as shown in FIG. 10, includes a right/left inclination angle sensor S11 for detecting a right/left inclination angle of the machine body relative to the horizontal surface and a fore/aft inclination angle sensor S12 for detecting a fore/aft inclination angle of the machine body relative to the horizontal surface. And, a control operational panel section 22 provided in the operational section 3 includes a posture control ON/OFF switch SW1 for instructing execution/stop of posture control, a horizontal return switch SW2 for setting a target inclination angle to the horizontal state, a harvesting control ON/OFF switch SW15 for instructing execution/stop of harvest height control, and four manual operation switches, i.e. a front up switch SW3, a rear up switch SW4, a left up switch SW5 and a right up switch SW6, having the function of changing the posture of the machine body by manual operations and the function of changing the target inclination angle during posture control, etc.

Figure 2:
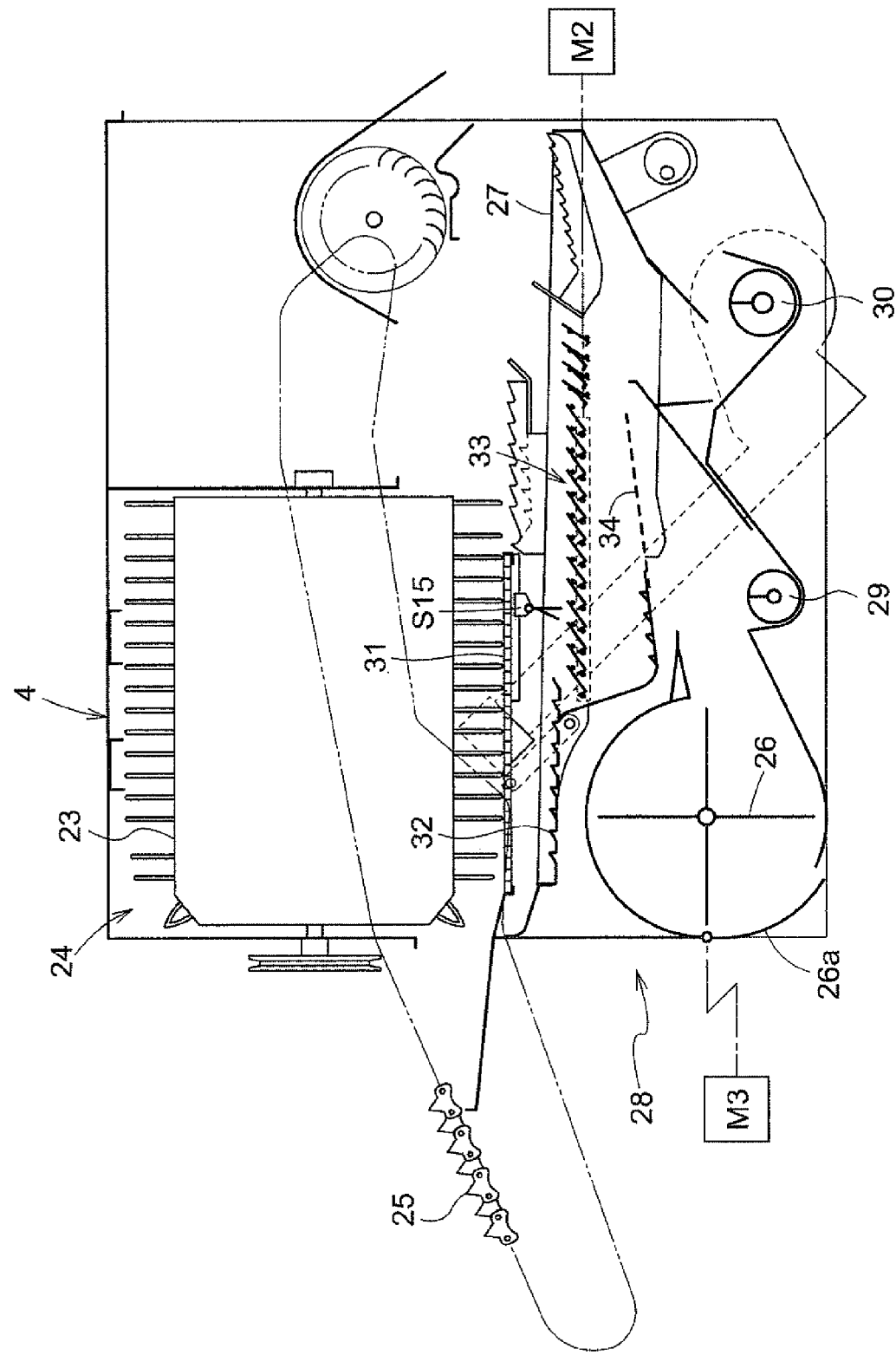
FIG. 2 is a view showing a construction of a threshing apparatus of the combine.

The threshing section 4, as shown in FIG. 2, includes a threshing chamber 24 accommodating a threshing drum 23, a feed chain 25 for conveying culms fed from the harvesting section 2, a sorting device 28 composed of a winnowing fan 26 and a swing sorting plate 27, a primary opening 29 for collecting grains and a secondary opening 30 for collecting mixture of grains and exhaust straws, etc. And, the separated grains from the processed material threshed in the threshing chamber 24 will fall through a receiving mesh or a 'concave' 31 provided at a lower portion of the threshing chamber 24 onto the sorting device 28, and the remaining processed material will fall from the rear end of the receiving mesh 31 onto the sorting device 28.

The swing sorting plate 27 of the sorting device 28 includes a grain pan 32 disposed upwardly of the winnowing fan 26 for conveying the processed material dropped from the threshing chamber 24 to the rear side of the machine body, a chaff sieve 33 disposed rearwardly of the grain pan 32 for effecting rough sorting of the processed material, a grain sieve 34 disposed downwardly of the chaff sieve 33 for effecting fine sorting of the processed material, etc. The chaff sieve 33 comprises a plurality of band plate-like members juxtaposed along the conveying direction of the processed material and the distance between adjacent band plate-like members (i.e. the chaff opening degree) is varied by a chaff opening degree adjusting motor M2 as an actuator. And, for detecting this chaff opening degree, there is provided a chaff opening degree sensor S13 (see FIG. 10) utilizing a potentiometer.

The winnowing fan 26 is for belowing away straw chaffs on the swing sorting plate 27. When a rear side fan case cover 26a is opened/closed by a winnowing fan wind force adjusting motor M3 as an actuator, the wind force (referred to as "winnowing force") applied to the processed material on the swing sorting plate 27 is varied in such manner that the greater the opening degree, the smaller the wind force toward the front side. And, a winnowing force sensor S14 (see FIG. 10) using a potentiometer is provided for detecting the winnowing fan wind force by detecting the opening degree of this fan case cover 26a. Further, a sieve sensor S15 is provided for detecting the layer thickness of the processed material on the swing sorting plate 27.

As shown in FIG. 1, the unloader 6 includes a downwardly oriented discharge opening 6a at the leading end thereof, and a base end portion of the unloader 6 is supported to a support portion 35 to be vertically pivotable about a horizontal axis P2 by an unloader lift cylinder CY6 and this support portion 35 is pivoted to the machine body V to be swivellable about a vertical axis Y by an unloader swivel motor M4. And, there are provided an unloader position sensor S16 comprised of a potentiometer for detecting a swivel position of the support portion 35 and an unloader upper limit sensor S17 for detecting the unloader 6 being at its upper limit position (see FIG. 10).

Further, as shown in FIG. 10, an unloader operating panel section 36 provided in the operational section 3 includes a projecting switch SW7 for moving the unloader 6 to an outwardly projected position, a storing switch SW8 for moving the unloader 6 to its home position, a right swiveling instructing switch SW9 for manually instructing right swiveling, a left swiveling instructing switch SW10 for manually instructing left swiveling, an elevating instructing switch SW11 for manually instructing an elevating operation, a lowering instructing switch SW12 for manually instructing a lowering operation, an unhulled rice discharging switch S13 for instructing ON/OFF of an unhulled rice discharging clutch, etc.

Figure 9:
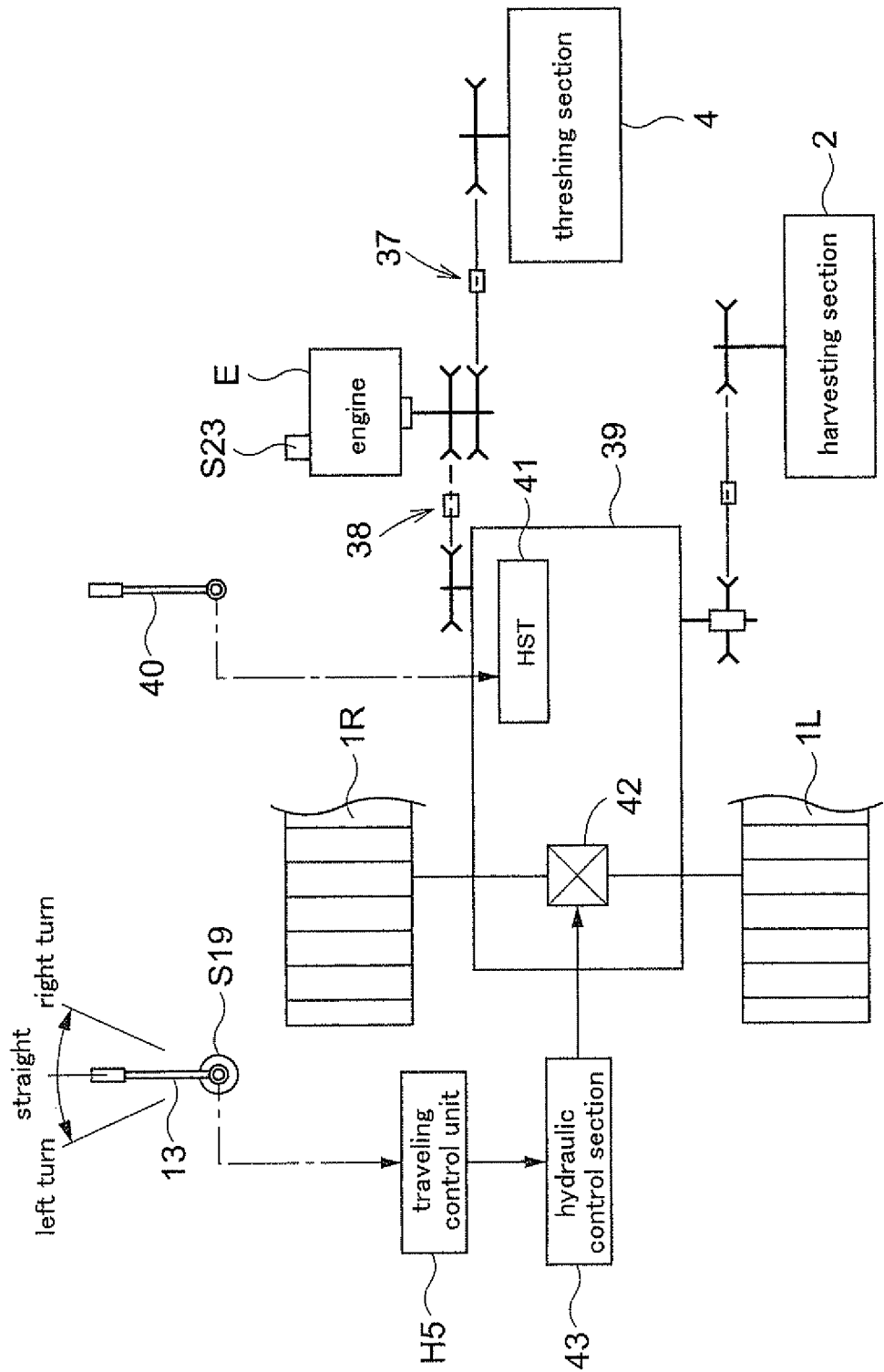
FIG. 9 is a view showing a transmission construction of the combine.

Referring next briefly to the power transmission mechanism, as shown in FIG. 9, the output of an engine E is transmitted via a threshing clutch 37 to the threshing section 4 and also transmitted via a main clutch 38 to a transmission section 39. The transmission section 39 includes a stepless speed-changing device 41 (HST) for effecting speed changing operation in response to an operation of a speed-changing operational member 40, and includes also a turning condition switchover mechanism 42 having the well-known construction, which can be switched over into a slow turning condition (or a grand turning condition) in which one traveling device is driven at a lower speed than the other traveling device, a braked turning condition in which one traveling device 1 is kept under the braked condition, and a reverse turning condition in which one traveling device is driven in the opposite condition to that of the other traveling device. Although explanation of details of this turning condition switchover mechanism 42 will be omitted, this mechanism includes a hydraulic clutch for the slow turning for switching over to the slow turning condition, a hydraulic clutch for the braked turning for switching over to the braked turning condition, a hydraulic clutch for the reverse turning for switching over to the reverse turning condition, etc. and includes also a hydraulic control section 43 having a plurality of hydraulic control valves for switching over pressure-oil conditions to these respective hydraulic clutches. Further, there is provided a threshing clutch sensor S18 (see FIG. 10) for detecting ON/OFF state of the threshing clutch 37.

The switching operations of the turning condition switchover mechanism 42 are effected by right/left pivotal operations of the harvesting height steering lever 13 provided in the operational section 3. That is, there is provided a potentiometer type steering lever sensor S19 (see FIG. 10) for detecting a right/left pivotal operational amount of the harvesting height steering lever 13 and in response to an operation of the harvesting height steering lever 13, the turning condition switchover mechanism 42 is switched over.

Figure 7:
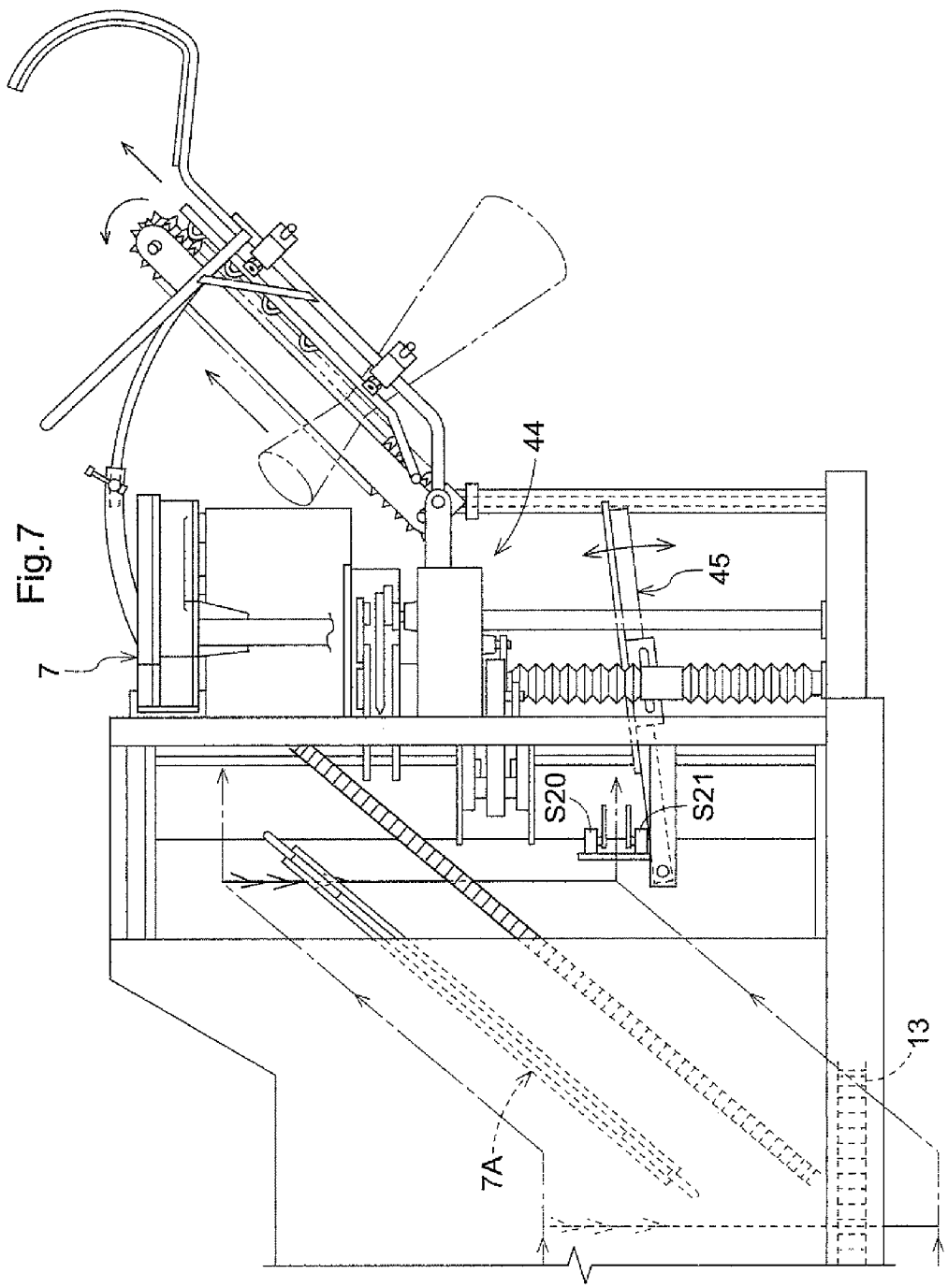
FIG. 7 is a plan view of a bundling device of the combine.
Figure 8:
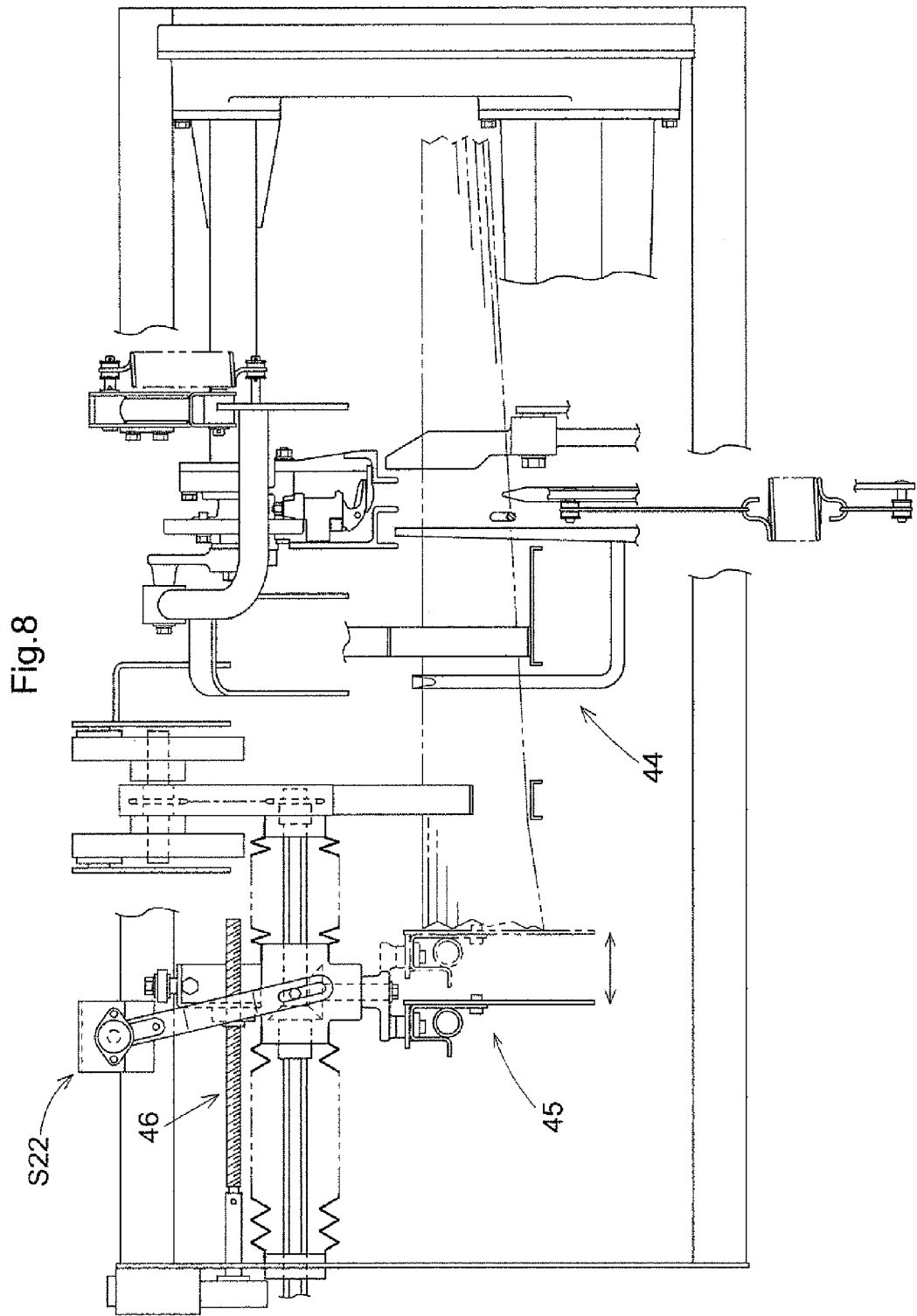
FIG. 8 is a rear view of the bundling device of the combine.

The bundling device 7, as shown in FIG. 7 and FIG. 8, includes a bundling machine 44 for bundling exhaust straws discharged from the threshing section 4 by the exhaust straw conveying device 7A by a predetermined amount; a stock leveling mechanism 45 for leveling, i.e. rendering uniform the root ends of the exhaust straws by tapping on them; a thread-feeding type position adjusting mechanism 46 capable of adjusting the position of the stock leveling mechanism 45 along the culm length direction of the exhaust straws; and a pair of exhaust straw detecting sensors S20, S21 for detecting whether the stock end position of the exhaust straws is located at an appropriate position relative to the bundling machine 44. Further, this bundling device 7 includes a potentiometer type stock leveling position detecting sensor S22 for detecting the position of the stock leveling mechanism 45 in the exhaust straw culm length direction. Though not to be described in details, an arrangement is provided such that based upon information of this stock leveling position detecting sensor S22, the position of the conveying terminal end of the exhaust straw conveying device is varied so as to render the bundling position to an appropriate position.

And, there are provided in distribution, a plurality of control units capable of communicating with each other via a data communication network TU. And, each one of the plurality of control units effects controlling of a controlled object assigned respectively thereto, based upon input information inputted by information inputting means provided therein, control information communicated from a further (i.e. non-self) control unit, and control management information.

For instance, a main control unit H1 for controlling e.g. the harvesting lift cylinder C1, etc. is disposed adjacent the harvesting section 2. A machine control unit H2 for controlling the unloader 6 is disposed adjacent the grain tank 5. A posture control unit H3 is disposed adjacent the disposing positions of the hydraulic cylinders for posture control. A threshing control unit H4 for controlling the threshing section 3 is disposed in the threshing section 3. A bundling control unit H6 is disposed adjacent the bundling device 7, and so on. In this way, a plurality of control units are disposed in distribution in the respective vicinity of the controlled objects assigned respectively thereto.

More particularly, as shown in FIG. 10, as the plurality of control units H, there are provided the main control unit H1, the machine control unit H2, the posture control unit H3, the threshing control unit H4, the traveling control unit H5, the bundling control unit H6 and an engine control unit H7, respectively. And, each one of these control units includes a microcomputer and is capable of communicating information via an unillustrated communication module provided therein; and via the data communication network TU of the CAN (Controller Area Network) type, comprising communication bus lines 47 connected to the communication module. Further, the control operation panel 22 provided in the operational section 3, the unloader operation panel section 36, and a display panel section 46 for displaying various kinds of information, are capable of communicating information via the data communication network TU.

Referring briefly to the communication data communicated via the data communication network TU, the communication data comprise a plurality of bit sequences of data including the other party address data for specifying the other party for transmission, control contents information indicating control contents to be processed, and specific control data (numeric data, etc.).

Next, the respective control units will be described.

The main control unit H1 executes harvesting height control, when activated by conditions of an ON operation of the harvesting control ON/OFF switch SW15 provided in the control operation panel section 22 and of the height of the harvesting section 2 detected by the harvesting lift position sensor S1 being lower than a set height. That is, the section H1 controls the harvesting lift cylinder C1 as its controlled object based upon the information from the harvesting height sensor S2 as information inputting means so that the harvesting height of the harvesting section 2 may be maintained at the target set height. Further, the main control unit H1 controls the harvesting lift cylinder C1 so that the harvesting section 2 is elevated in response to an ON operation of the elevating switch 14 and the harvesting section 2 is lowered in response to an ON operation of the lowering switch 15. The detection information of the elevating switch 14 and the lowering switch 15 is inputted to the machine control section H2, as shown in FIG. 10 and these detection data are communicated as control information to the main control unit H1.

The machine control unit H2 executes the threshing depth control when activated by conditions of an ON operation of a threshing depth automatic switch SW14 provided in the control operation panel section 22 and of an ON operation of the stock root sensor S3. In this, based upon the information of the ear-tip side culm sensor S4 and the root side culm sensor S5 as the information inputting means, the threshing depth motor M1 as an actuator will be controlled such that the ear-tip position of the conveyed culms may be appropriately between the sensors S4, S5.

Further, the machine control section H2 controls the unloader 6, in addition to the threshing depth control. That is, the movements of the unloader 6, such as swiveling, lifting up/down, storing, corresponding to the operational instructions from the respective operational switches provided in the unloader operational panel section 36 will be controlled. In this, based upon the detection information of the unloader position sensor S16 and the unloader upper limit sensor S17 as the information inputting means, the unloader lift cylinder CY6 and the unloader swiveling motor M4 will be controlled as actuators.

The posture control unit H3 starts the posture control in response to an ON operation of the posture control ON/OFF switch SW1 provided in the control operational panel section 22; and the unit H3 controls, based on the right/left inclination angle sensor S11 and the fore/aft inclination angle sensor S12 as the information inputting means, the four cylinders C2-C5 as machine body posture changing actuators so that the fore/aft inclination angle and the right/left inclination angle of the machine body V may be rendered to the respective target inclination angles. Further, if any one of the manual operational switches SW3-SW6 is operated under the OFF state of the posture control ON/OFF switch SW1, one of the hydraulic cylinders will be controlled so that the posture will be changed to the instructed direction while the switch is being operated. During execution of the posture control, if any one of the manual operational switches SW3-SW6 is operated, the posture will be changed to the instructed direction. The posture realized at the time of stop of this operation will be newly set as a target inclination angle.

The threshing control unit H4 executes threshing control, by the conditions of the threshing clutch 37 being engaged and of the root sensor S3 being ON. In this threshing control, based upon the information of the sieve sensor S15 as the information inputting means, the chaff opening degree adjusting motor M2 and the winnowing fan wind force adjusting motor M3 will be controlled so as to obtain an appropriate layer thickness on the sieve. The detection information of the root sensor S3 will be inputted to the main control unit H1 as shown in FIG. 10, and this detection information is communicated as control information to the threshing control unit H4.

Based upon information of the steering lever sensor S19 as information inputting means, if an instruction for straight traveling is given, the traveling control unit H5 switches the turning condition switching mechanism 42 to straight traveling condition, whereas, if an instruction for turning is given, the unit H5 switches the turning condition switching mechanism 42 to a turning condition and also switches the turning condition switching mechanism 42 to provide a turning force based on information from the steering lever sensor 13, in the course of which the hydraulic control section 43 is controlled.

The bundling control unit H6 executes bundling control. In this bundling control, the position adjusting mechanism 46 is controlled so that the stock end position of the exhaust straws may be at an appropriate position, that is, a condition that only one sensor S20 of the exhaust straw detecting sensor S20, S21 located on the side of the culms being present detects the presence of exhaust straws. Simultaneously, based on the information from the stock leveling position detecting sensor S22, the conveying end position of the exhaust straw conveying device 7A is also controlled.

The engine control unit H7 receives, as the control information from the main control unit H1, control switchover instruction information, target rotational speed information and accelerator operational amount information. Based upon the control switchover instruction information, a mode of executing the isochronous control for maintaining the output rotational speed of the engine E at a target rotational speed and a mode for executing the droop control for adjusting the output rotational speed of the engine E to a speed corresponding to an accelerator operational amount are switched over therebetween. Further, to this engine control unit H7, control management information such as a model type data, fine adjustment data etc. to be described later, are not transmitted. Rather, such information are stored in an unillustrated memory for the engine.

To add some explanation, the main control unit H1 receives detection information of a potentiometer type accelerator setter 49 which can be variably set by a manual operation and detection information of the threshing clutch sensor S18, and transmits these information as control information to the engine control unit H7. If the threshing clutch sensor S18 detects clutch engaged condition, then, an instruction for executing the isochronous control will be issued. Whereas, if the threshing clutch sensor S18 detects a clutch disengaged condition, an instruction for executing the droop control will be issued.

To the engine control unit H7, detection information of the rotational speed sensor S23 for detecting the rotational speed of the engine E is inputted. And, if an executing instruction for the isochronous control is transmitted from the main control unit H1 as control switchover instructing information, the engine E will be controlled such that its output rotational speed is maintained to the target rotational speed which was set in advance to a value suitable for a work. Specifically, the fuel supply amount by an electronic governor 55 is adjustably controlled. On the other hand, if an executing instruction for the droop control is transmitted as the control switchover instructing information, the fuel supply amount by the electronic governor 55 is controlled for adjusting the output rotational speed of the engine E to a speed corresponding to an accelerator operational amount.

As described above, the information of the stock root sensor S3 inputted to the main control unit H1 is communicated via the data communication network to the threshing control unit H4. As an example of other control information than the above to be communicated from a further control unit, there is information for enabling the further control unit to control the control condition of the one control unit. For instance, the posture control unit H3 executes the posture control for rendering the right/left inclination angle of the machine body V to a target inclination angle. In this, the right/left target inclination angle of the machine body will be changed by a manual operation, so that a target inclination angle inclined to either right or left side no smaller than a set angle relative to the horizontal posture will be set. In such case, this information is transmitted as control information to the main control unit H1. The main control unit H1 executes a target harvesting height correcting process for correcting the target harvesting height to a value higher by a predetermined amount than the value set by the harvesting height setter 12. In addition to the above-described information, various kinds of information are transmitted as control information.

And, the main control unit H1 sets one or some of all the other control units of the plurality of control units, i.e. the machine control unit H2, the posture control unit H3, the threshing control unit H4, the traveling control unit H5 and the bundling control unit H6, as storage object control units. Further, the main control unit H1 is set as the information management control unit having a nonvolatile memory 50 as a writable nonvolatile memory for storing the control management information of such other respective control units as well as the control management information for its own. Upon activation with power supply, this main control unit H1 executes a control management information distributing process for transmitting the control management information stored in the nonvolatile memory 50 to the storage object control units via the data communication network TU. Then, each one of the storage object control units, upon activation with power supply, executes a control management information obtaining process. In this control management information obtaining process, the storage object control unit receives the control management information for its own from the main control unit H1 via the data communication network TU. The nonvolatile memory 50 comprises an electrically writable and erasable EEPROM or a flash memory.

And, as examples of the control management information to be stored in the nonvolatile memory 50, there are model type data which are information of the machine model type, fine adjustment data which are the information for use in adjustment of individual unit difference in detection values of the detecting sensors when the controlled body is operated to the reference position by the actuator, and control setting data relating to a width of control-insensitive area at the time of execution of control.

Further, the main control unit H1 has a function of storing in the nonvolatile memory 50, the detection value of the harvesting lift position sensor S1 when the harvesting section 2 is lifted to its upper limit position.

The detection values of the threshing depth sensor S6 when the conveying device 11 as the controlled body is moved by operation of the threshing depth motor M1 to the deepest threshing position and the shallowest threshing position; and the detection value of the unloader position sensor S16 when the unloader 6 is swiveled to its home position, etc. are transmitted as examples of the fine adjustment data from the machine control unit H2 to the main control unit H1 and stored in the nonvolatile memory 50.

The detection values of the stroke sensors S7-S10 are transmitted, as further examples of the fine adjustment data, from the posture control unit H3 to the main control unit H1, when the respective cylinders as the controlled objects are operated to the uppermost position and the lowermost position. And, these transmitted data are stored in the nonvolatile memory 50. Further, as the control setting data, the information of the width of control-insensitive area at the time of execution of the posture control is also transmitted to the main control unit H1 and stored in the nonvolatile memory 50.

The detection values of the chaff opening degree sensor S13, as further examples of the fine adjustment data, are transmitted from the threshing control unit H4 to the main controller H1, when the chaff sieve 33 is operated to the full open position and full closed position respectively as the reference positions. And, these transmitted data are stored in the nonvolatile memory 50.

As further examples of the fine adjustment data, the detection value of the steering lever sensor S19 when the harvesting height steering lever 13 is operated to the maximum turning operational position as the reference position; and the detection value of the steering lever sensor S19 at a position corresponding to the straight traveling are transmitted from the traveling control unit H5 to the main control unit H1. And, these transmitted data are stored in the nonvolatile memory 50. As an example of the control setting data, information of the control-insensitive area under the neutral condition for maintaining the straight traveling condition is transmitted to the main control unit H1, and stored in the nonvolatile memory 50.

As a further example of the fine adjustment data, the detection values of the stock leveling position detecting sensor S22 when located at the ends at the opposed sides in the exhaust straw culm length direction as the references positions are transmitted from the bundling control unit H6 to the main control unit H1 and stored in the nonvolatile memory 50.

Further, each one of the storage object control units (H2-H6) executes a fine adjustment data obtaining process for updating the fine adjustment data; and when new fine adjustment data for updating is obtained by this fine adjustment data obtaining process, the unit transmits this fine adjustment data to the information management control unit. That is, in case e.g. a trouble occurred in any of the various detecting sensors as the information inputting means with continued use of the combine and replacement thereof has been done, the storage object control unit (H2-H6) newly obtains the fine adjustment data by executing the fine adjustment data obtaining process.

Though not shown, referring further to the fine adjustment data obtaining process, the storage object control unit is switched over to a control mode for obtaining fine adjustment data, in response to a special input operation such as a power supply with continued depression of a maintenance switch, for example. And, the actuator or the like (hydraulic cylinder, electric motor, etc.) will be controlled so as to provide an operational mode for fine adjustment detection in that control mode; and a detection value of the repaired and newly replaced detecting sensor, when the controlled body is operated to its reference position, is obtained as the updating fine adjustment data. And, when such updating fine adjustment data have been obtained, this updating fine adjustment data will be transmitted to the main control unit H1 and stored in its nonvolatile memory 50.

The fine adjustment data described above are transmitted from the storage object control units (H2-H6) to the main control unit H1 and stored in its nonvolatile memory 50. In this, if the communication by the data communication network TU is not effected properly, fine adjustment data may not be obtained. To cope with this, there is provided a read-only memory (ROM) for storing alternative control management information. In operation, if no control management information for its own cannot be received from the main control unit H1 even after lapse of a management setting period after activation with power supply, the controlled object for its own will be controlled based on this alternative control management information stored in the ROM.

Not only the storage object control units (H2-H6), but also the main control unit H1 has such ROM for storing alternative control management information. So, in case the control management information is not available from the nonvolatile memory 50, the controlled object will be controlled based upon the alternative control management information stored in the ROM.

As this ROM, there is employed a ROM storing a control program for controlling a controlled object assigned thereto. And, in this ROM 52, the control management information for its own is stored in advance. As the ROM 52, a mask ROM, a PROM, etc. can be used.

Incidentally, as the above-described fine adjustment data, the various kinds of information described above are just non-limiting examples. Other kinds of information can be stored also. Further, the above-described fine adjustment data are stored in advance at the time of shipping from the factory, but may be stored when a repair, a component-replacement or the like has been carried out. That is, when the storage object control unit (H2-H6) has obtained updating fine adjustment data by the fine adjustment data obtaining process, this fine adjustment data will be transmitted to the main control unit H1 and stored in its nonvolatile memory 50. Further, the machine model type data will be stored in advance in the nonvolatile memory 50, prior to the shipping of the combine from the factory.

Further, of the respective control units, the traveling control unit H5 corresponds to a "specified storage object control unit". For instance, if the detection value of the operational position corresponding to the straight traveling is not stored as a value appropriate for each individual machine, the machine or vehicle body may not travel straight even if the harvesting height steering lever 13 is operated to the straight traveling condition. Then, this traveling control unit H5 stores the control management information transmitted from the main control unit H1 in a writable nonvolatile memory 51 provided in the specified storage object control unit for storing the control management information for its own. This memory 51 can be an electrically writable and erasable EEPROM, a flash memory, etc.

Until lapse of a predetermined management setting period after the activation with power supply (e.g. for 1.5 seconds), the main control unit H1 executes a control management information distributing process for transmitting via the data communication network TU the control management information stored in the nonvolatile memory 50 to the storage object control unit; and also, upon lapse of the management setting period, executes a control information communicating process for transmitting/receiving the control information to/from the other control unit. Further, until the lapse of the management setting period after activation with power supply, each one of the storage object control units (H2-H6) executes a control management information obtaining process for obtaining the control management information for its own from the main control unit H1 via the data communication network TU; and also, upon lapse of the management setting period, executes the control information communicating process for transmitting/receiving the control information.

Further, in the control management information obtaining process, the storage object control unit (H2-H6) transmits a plurality of kinds of request information respectively requesting the plurality of kinds of control management information according to a predetermined sequence. In this, upon receipt of a preceding sequence kind of control management information, request information requesting the subsequent sequence kind of control management information is transmitted. When the plurality of kinds of control management information are being transmitted according to the predetermined sequence in the control management information distributing process, if none of the plurality of storage object control units receives any kind of control management information, the subsequent sequence kind of control management information will be transmitted.

Further, if each one of the storage object control units does not receive the requested kind of control management information in the control management information obtaining process, the request information for that kind of control management information will be transmitted in repetition with each lapse of the setting unit time period.

Next, the control operations by the main control unit H1 and the storage object control units, after power-ON, will be specifically described.

Figure 11:
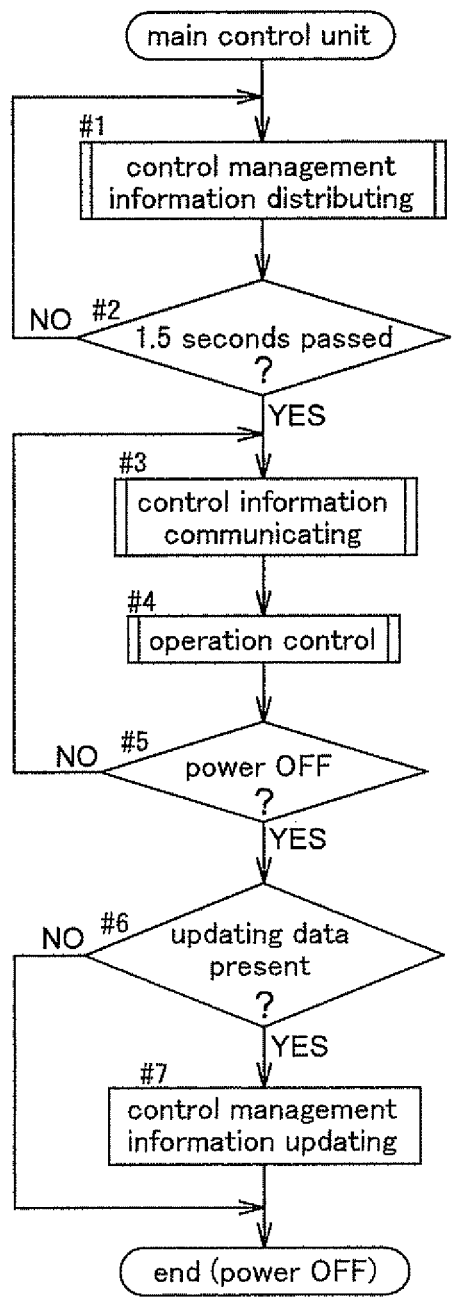
FIG. 11 is a flowchart of control operation.

First, the control contents of the main control unit H1 will be described. As shown in FIG. 11, this main control unit H1 executes the control management information distributing process until lapse of the management setting period (1.5 seconds) after the activation (steps #1, #2), and upon lapse of the management setting period after the activation (1.5 seconds), the unit H1 executes a control information receiving process until the power is OFF and controls the controlled object (e.g. the harvesting lift cylinder C1) assigned thereto (steps #3, #4, #5). Incidentally, in the control information receiving process, the same steps as in the above-described data receiving process will be executed. And, when the power is turned OFF, if there is some data to be updated, the unit H1 executes an updating process of the nonvolatile memory 50 regarding the control management information (steps #6, #7).

Next, the control management information distributing process will be described.

Figure 12:
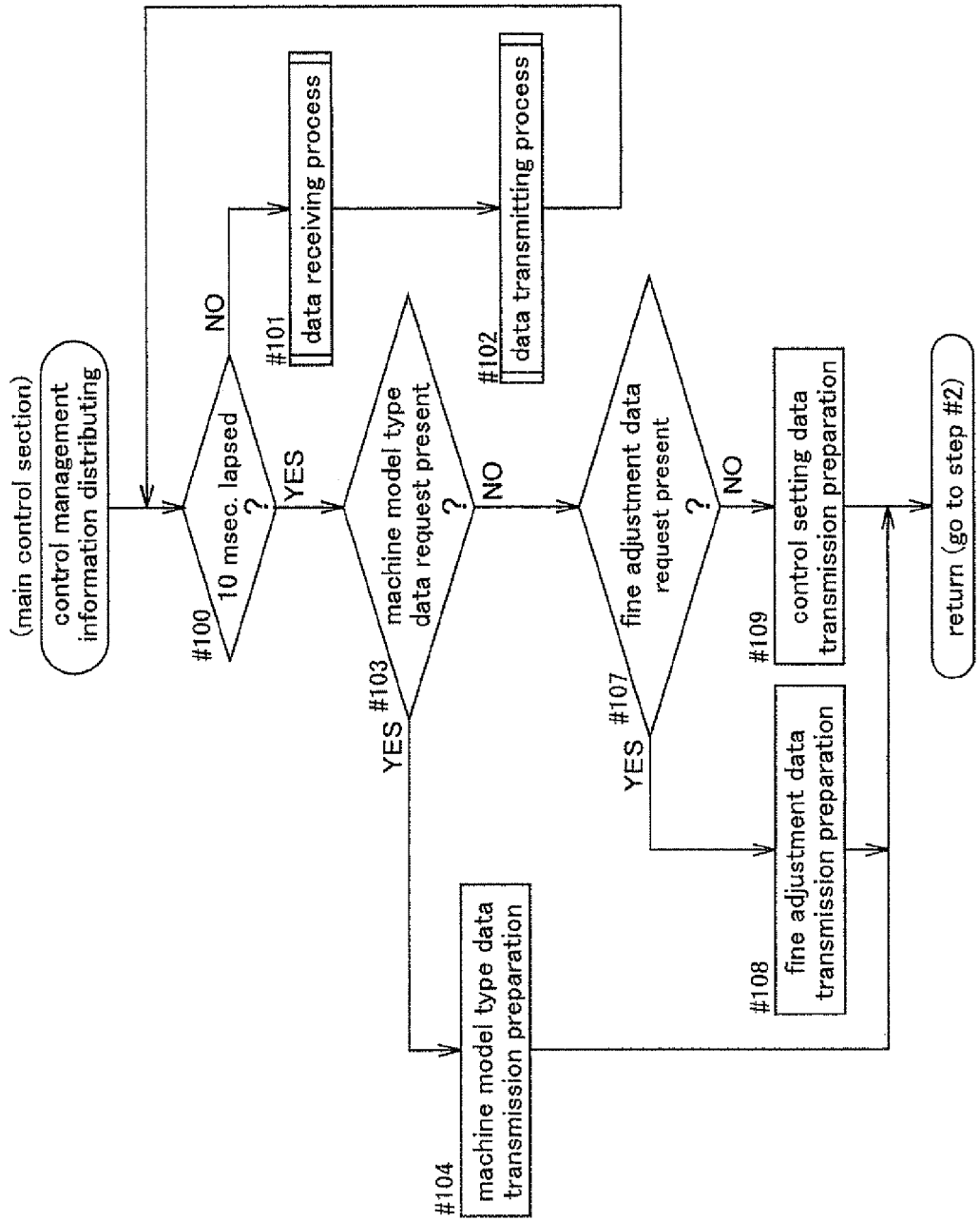
FIG. 12 is a flowchart of control operation.

As shown in FIG. 12, upon initiation of the control management information distributing process, the data receiving process and the data transmitting process will be executed (steps #100, #101, #102). The data receiving process will be described later. The data transmitting process is a process for transmitting data set in a transmission buffer onto a communication bus line 47.

And, with each lapse of the set unit time (10 msec.), the data being requested by the plurality of storage object control units are transmitted. That is, if any one of the storage object control units is transmitting request information for the machine model type data, then, the process makes preparation for transmitting the model type data stored in the nonvolatile memory 50 (steps #103, #104). Referring to this transmission preparation, this is a process of setting data to be transmitted (the model type data) in the transmission buffer. With this setting in the transmission buffer, these data will be transmitted onto the communication bus line 47 in the data transmitting process at step 3. The process will be carried out similarly, in the subsequent transmission preparation.

If none of the plurality of storage object control units is transmitting the model type request data requesting the model type data and any one of them is transmitting the fine adjustment request data requesting fine adjustment data, then, the process makes preparation for transmitting the fine adjustment data stored in the nonvolatile memory 50 (steps #107, #108). If none of the plurality of storage object control units is transmitting the fine adjustment requesting data, the process makes preparation for transmitting control setting data (step #109). This preparation for transmission of control setting data is effected in repetition, with each lapse of the setting unit period (10 msec.) even in the event of absence of request from any of the storage object control units.

Next, the data receiving process will be described.

Figure 13:
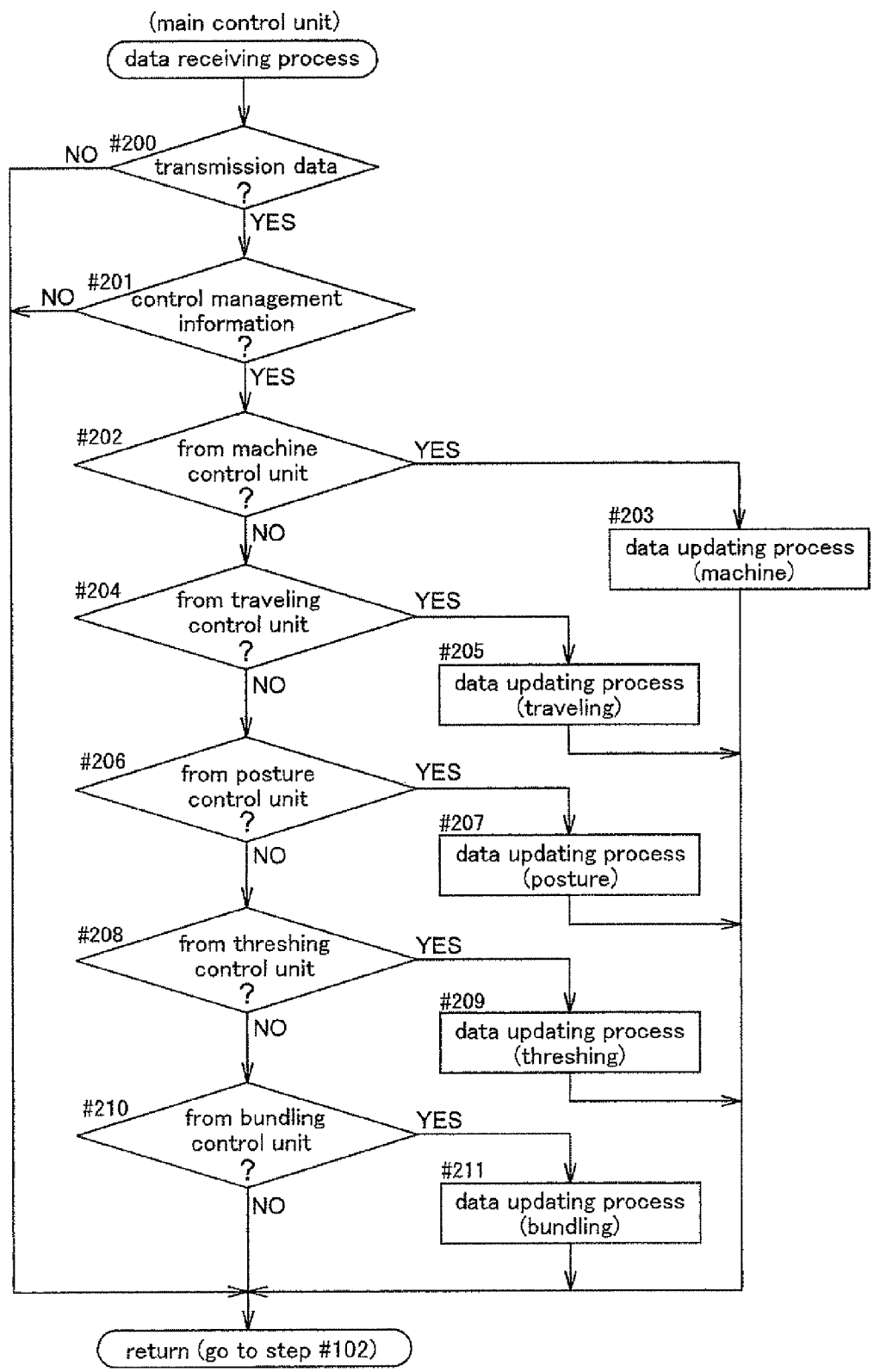
FIG. 13 is a flowchart of control operation.
Figure 14:
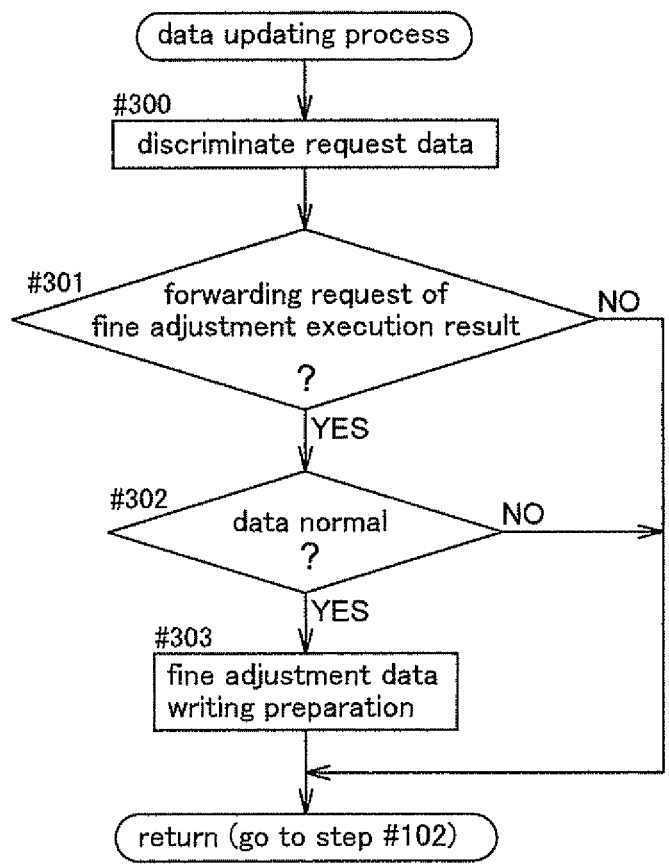
FIG. 14 is a flowchart of control operation.

As shown in FIG. 13, if the received data are data requesting transmission of control management information (steps #200, #201) and if these received data are transmission data from the machine control unit H2, then, a data updating process corresponding to the machine control unit H2 will be executed (steps #202, #203). This data updating process will be executed as illustrated in FIG. 14. That is to say, the process determines which data the machine control unit H2 is requesting (step #300). If forwarding of fine adjustment execution result is being requested, and if the data representing the kind of fine adjustment updating data included in the data are normal and also the data indicating the fine adjustment data are normal (not zero), the process makes preparation for writing the fine adjustment data to be updated in the nonvolatile memory 50 (steps #301, #302, #303). That is, the data will be set in a buffer for writing. If such updating process is effected, as described above, before the power is turned OFF, the updating process of the control management information to the nonvolatile memory 50 will be effected (steps #4, #5).

And, such updating process of fine adjustment data will be effected for each one of the data received from the other storage object control units, i.e. the posture control unit H3, the threshing control unit H4, the traveling control unit H5 and the bundling control unit H6 (steps #204 through #210).

With this main control unit H1, when the control management information for its own cannot be received from the nonvolatile memory 50 in the control information receiving process, appropriate control cannot be executed. Therefore, in such case, the data stored in the ROM 52 will be set as the control management information and the controlled object (harvesting lift cylinder C1, etc.) assigned thereto will be controlled.

Next, the control contents in the storage object control units (H2-H6) will be described.

Figure 15:
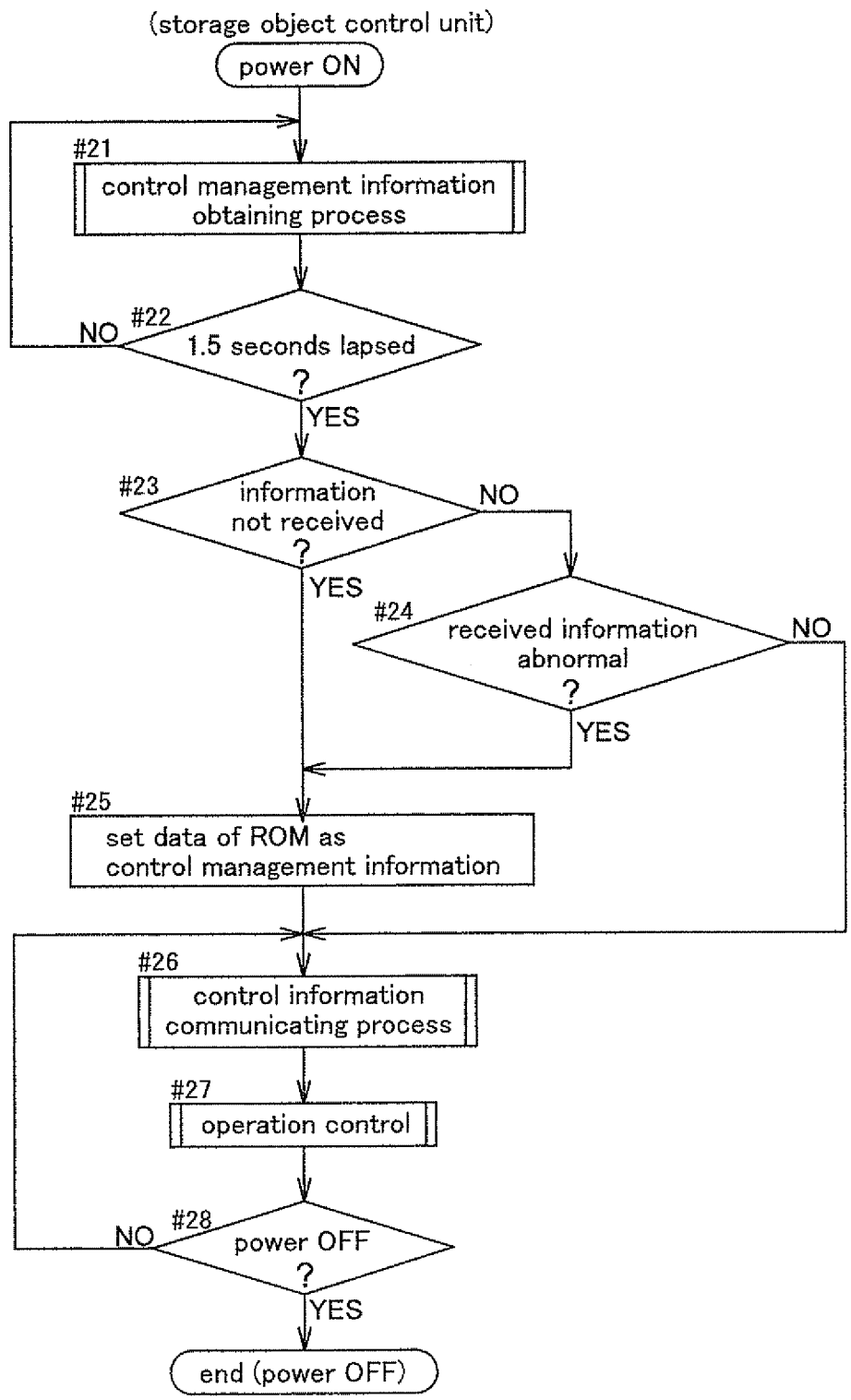
FIG. 15 is a flowchart of control operation.

As shown in FIG. 15, after activation with power supply, for the period until lapse of the management setting period after the activation (1.5 seconds), the control management information obtaining process is executed (steps #21, #22). And, if no control management information has been obtained yet even after the lapse of the management setting period after the activation (1.5 seconds) or if the obtained control management information exceeds a permissible range, thus being clearly an abnormal value, then, no appropriate control can be made. So, in that case, the data stored in the ROM 52 will be set as the control management information (steps #23, #24, #25). Thereafter, a process for communicating the control management information to the other control units will be effected until the power is OFF and, the controlled object assigned to its own (e.g. the threshing depth motor M1) will be controlled (steps #26, #27, #28).

Next, the control management information obtaining process will be described.

Figure 16:
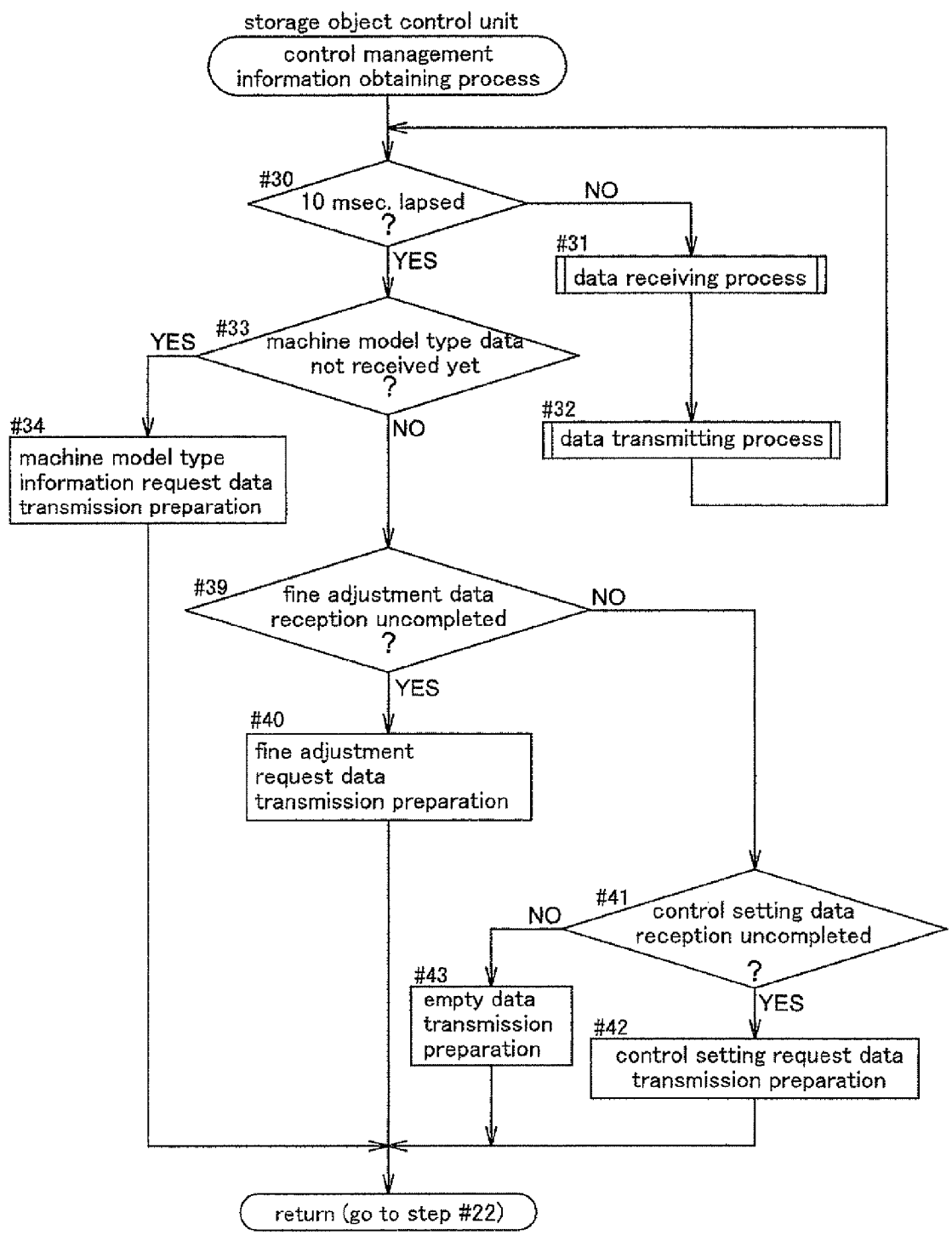
FIG. 16 is a flowchart of control operation.

As shown in FIG. 16, upon initiation of the control, the data receiving process and the data transmitting process will be carried out (steps #30, 31, 32). The data receiving process will be described later. The data transmitting process is a process for transmitting data set in the transmission buffer onto the communication bus line 47.

And, with each lapse of the setting unit time (10 msec.), a transmitting process of request information requesting necessary information as follows will be effected. That is, if the model type data are not received from the main control unit H1, the process makes preparation for transmitting model type requesting data as the request data requesting the model type data (steps #33, #34). If the model type data are received, then, the process determines whether fine adjustment data as the next order of control management information is received from the main control unit H1 or not; and if not received, the process makes preparation of transmission of fine adjustment request data as request data for requesting find adjustment data (steps #39, #40). If the fine adjustment updating data are received, then, the process determines whether control setting data are received from the main control unit H1 or not. If the control setting data are not received, then, the process makes preparation for transmission of control setting information requesting data as requesting data requesting control setting data. If the control setting data are received, the process makes preparation for transmission of empty data (transmission data having zero in all data areas thereof) (steps #41, #42, #43).

Therefore, if the storage object control unit does not receive the requested kind of control management information, the unit transmits in repetition, upon every lapse of the setting unit period (10 msec.), the requesting information corresponding to that kind of control management information.

Next, the data receiving process will be described. As the traveling control unit H5 partially overlaps in its contents of this process with the other storage object control units (H2, H3, H4, H6), the data receiving processes of the other storage object control units (H2, H3, H4, H6) other than the traveling control unit H5 will be described first.

Figure 17:
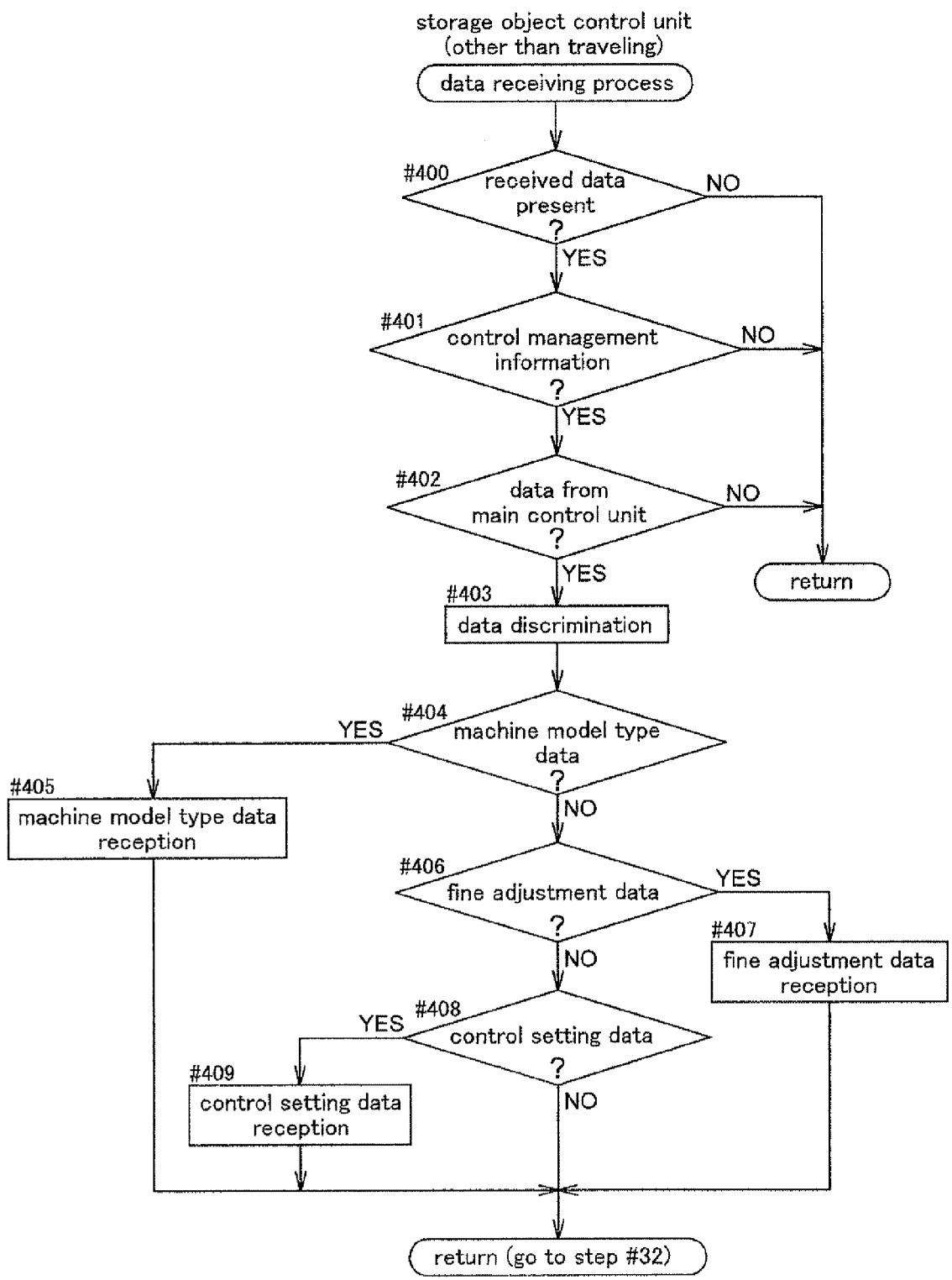
FIG. 17 is a flowchart of control operation.

That is, as shown in FIG. 17, if the received data are transmission data of control management information from the main control unit H1 (steps #400 through #403), and if these received data are the model type data, these data will be received in a condition to be recognizable as the model type data (steps #404, #405). If the received data are fine adjustment data, these data will be received in a condition to be recognizable as the fine adjustment data (steps #406, #407). If the received data are control setting data, these data will be received in a condition recognizable as the control setting data (steps #408, #409).

Next, the data transmitting process of the traveling control unit H5 will be described.

This traveling control unit H5 includes the nonvolatile memory 51 for storing the control management information for its own, as described hereinbefore. And, to this nonvolatile memory 51, the same contents will be written and stored in parallel with the writing to the nonvolatile memory 50 provided in the main control unit H1. Further, the ROM 52 is also provided for writing and storing therein the alternative control management information.

Figure 18:
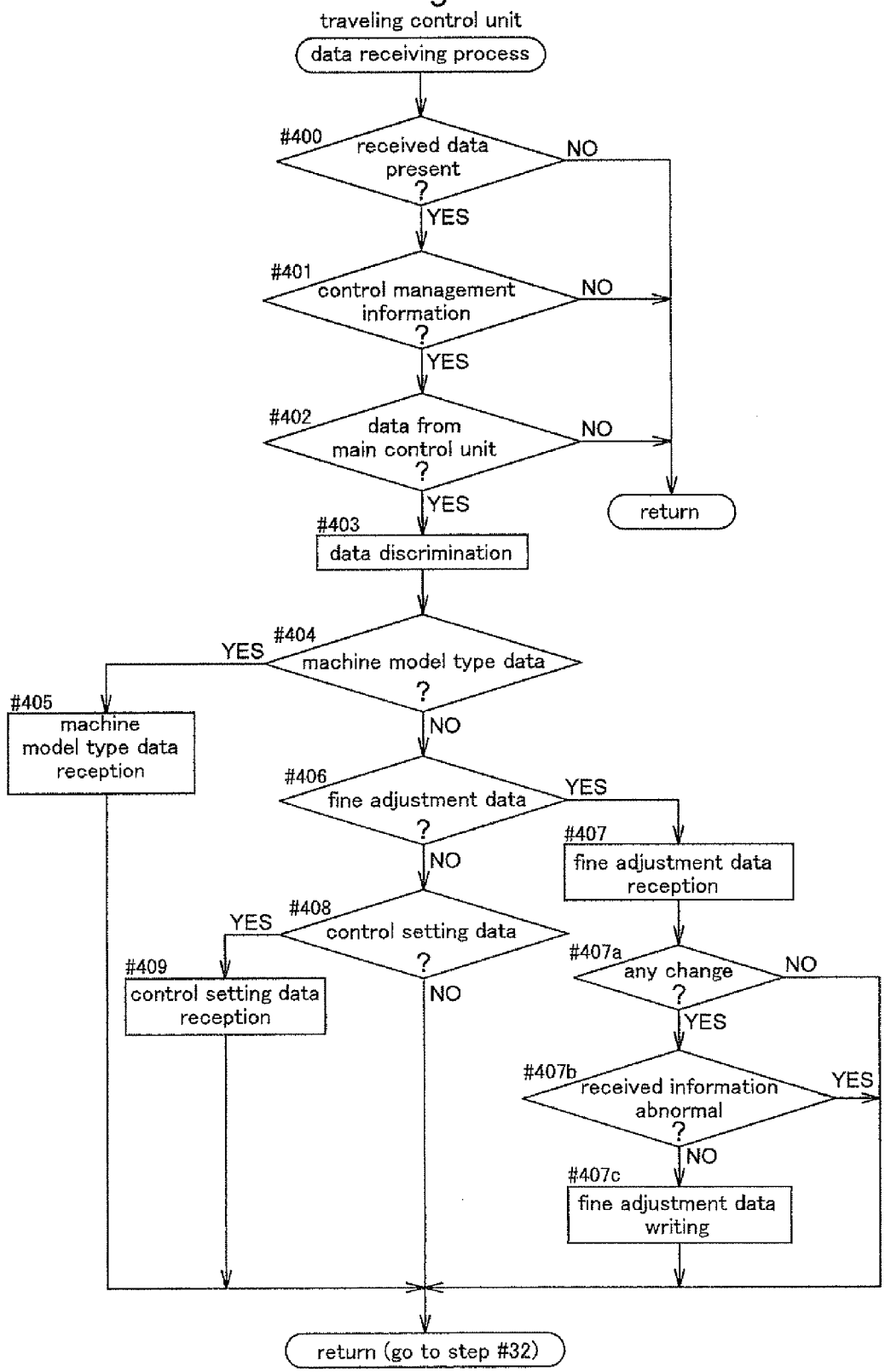
FIG. 18 is a flowchart of control operation.

This traveling control unit H5, as shown in FIG. 18, upon initiation of the control with power supply, executes the same processes as the processes by the other storage object control units, aside from the updating process to the nonvolatile memory 51 (steps #400 through #409). As for the same processes, explanation thereof will be omitted. And, the different processes alone will be described next.

If the control management information (fine adjustment data) transmitted from the main control unit H1 is different and has changed from the data stored in the nonvolatile memory 51 and also if this control management information is within the predetermined permissible range, thus not being any abnormal value, this obtained data will be written into the nonvolatile memory 51 for updating its contents (steps #407a, #407b, #407c). That is to say, if the control management information (fine adjustment data) transmitted from the main control unit H1 is same as or not changed from the currently stored data; or if the information exceeds the permissible range, thus being apparently abnormal, no updating process will be effected.

By not effecting any updating process in the case of no data change, it is possible to prevent reduction in the usable life of the nonvolatile memory 51 by unnecessary rewriting.

The traveling control unit H5, as the specified storage object control unit, is configured not to effect any updating process to its nonvolatile memory 51 if the control management information for its own cannot be received from the main control unit H1, or if the control management information, even received, exceeds in its value, the permissible range, thus being clearly abnormal.

Incidentally, in case no control management information has been received from the main control unit H1 or the received control management information exceeds the permissible range, thus being clearly abnormal, the data stored in the ROM 52 will be set as the control management information (steps #23, #24, #25) and the controlled object assigned thereto (e.g. the hydraulic control section 43) will be controlled with using these data.

And, as described above, with this combine, the traveling control unit H5 and the engine control unit H7 are capable of effectively controlling the controlled object assigned thereto independently, even in the event of absence of communication of the control management information from the main control unit H1. So, even when a communication trouble has occurred in the field, it is possible to cause the vehicle to travel out of the field to a safe place such as an inter-field path of the field, suitable for repair operation.

MODIFIED EMBODIMENTS

Next, modified embodiments will be described.

(1) In the foregoing embodiment, the information management control unit executes the control management information distributing process for the period after activation with power supply to the lapse of the management setting period; and each storage object control unit executes the control management information obtaining process for the period after activation with power supply to the lapse of the management setting period. Instead of this construction, a further construction is possible. In this case, the information management control unit continues execution of the control management information obtaining process as long as a request from the storage object control unit is present, so that the control management information obtaining process will be effected until each one of the storage object control unit has received the information reliably.

(2) In the foregoing embodiment, when the information management control unit is transmitting the plurality of kinds of control management information according to the predetermined sequence, if there arises a condition of none of the plurality of storage object control units transmitting the requesting information requesting that kind of control management information, the subsequent sequence kind of control management information is transmitted. Instead of this construction, a further construction is possible. In this case, all of the plurality of kinds of control management information are communicated in a butch. In this way, the method of communication may vary in many ways.

(3) In the foregoing embodiment, the specified storage object control unit includes a ROM for storing alternative control management information. However, the construction without such ROM is also possible.

(4) In the foregoing embodiment, the specified storage object control unit is provided with a nonvolatile memory for the particular control unit and a ROM. Instead, the specified storage object control unit may be provided with only the nonvolatile memory or only the ROM.

(5) In the foregoing embodiment, as the control management data, the machine model type data, fine adjustment data and control setting data are stored. Instead, only one or two of these may be stored. Or, any other kind of data than such data may be stored.

(6) In the foregoing embodiment, as specific examples of the storage object control units, the machine control unit H2, the posture control unit H3, the threshing control unit H4, the traveling control unit H5 and the bundling control unit H6 were cited. However, the present invention is applicable also to a control system not having one or some of these or a construction having other kinds of control units.

(7) In the foregoing embodiment, the combine was described as an example of the working machine. The invention may be any other kind of working machine than a combine and the invention is not limited to work vehicles, but may be applicable also to any stationary working machine.

[Similar Control System]

Next, an engine control system similar to the control system of the invention will be described with reference to the accompanying drawings. This control system controls an engine E according to working characteristics of an implement 103 driven by the engine E.

As a conventional engine control system for a working machine, there is known a system wherein a memory of an engine control unit stores therein fuel supply amount setting data, and also engine control instruction setting data for control characteristics corresponding to working characteristics of the implement, so that the engine control unit calculates an instruction engine rotational speed and an instruction engine torque based on the engine control instruction setting data, and the engine control unit controls a fuel supply amount of an engine fuel supplying device, based on these instruction information and fuel supply amount setting data.

With this system, since the engine control instruction setting data are stored in the memory of the engine control unit, the general versatility of the engine control unit is low. Namely, since the engine control instruction setting data are stored in the memory of the engine control unit, due to the limit of the storage capacity of the memory, this engine control unit can store engine control instruction setting data dedicated to only one kind or limited kinds of implement(s). For this reason, the engine control unit cannot be used as an engine control unit for driving other kinds of implements, so the general versatility of the engine control unit is low. On the other hand, with an engine control system to be described next, the general versatility of the engine control unit can be enhanced.

Figure 19:
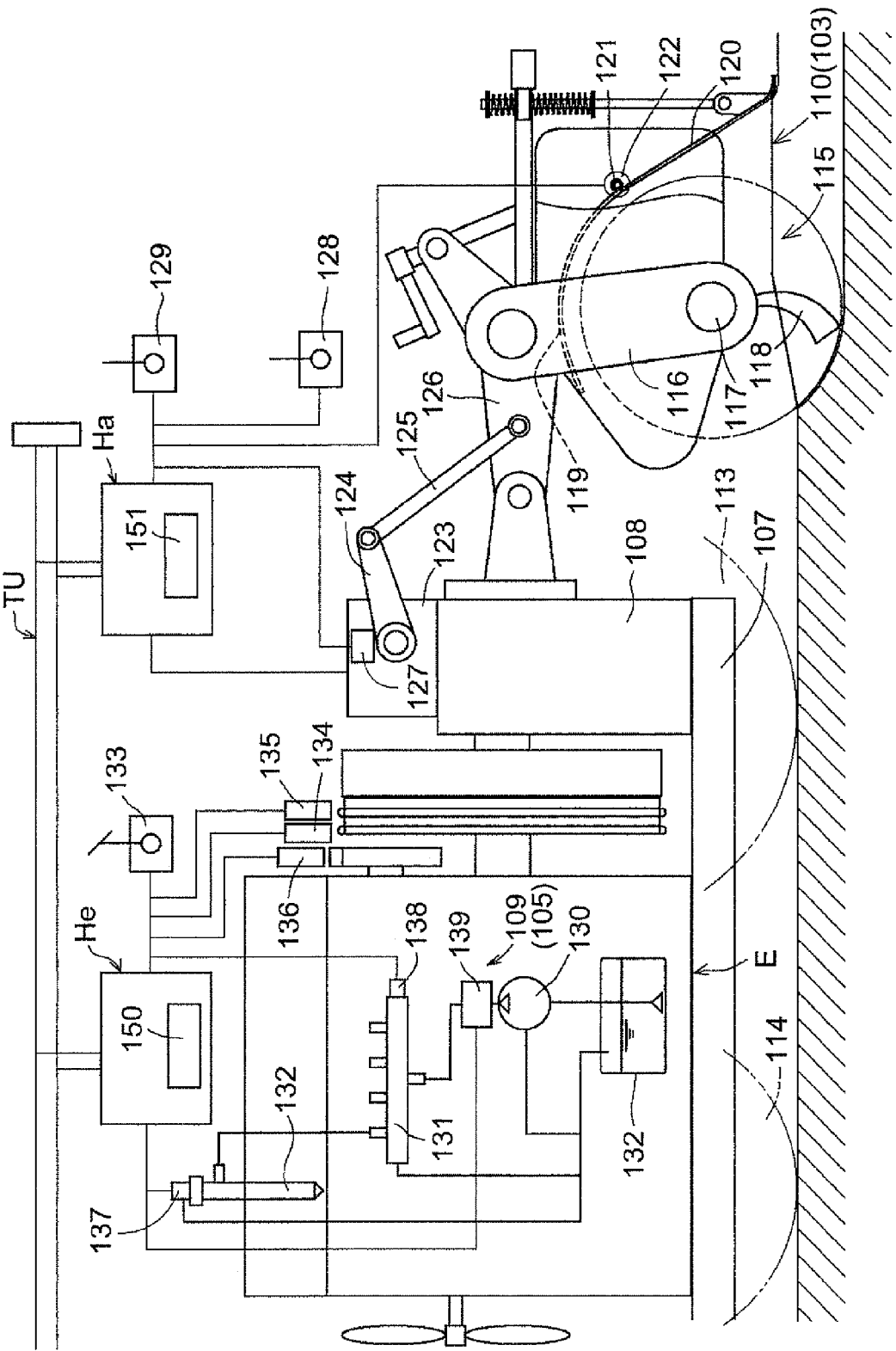
FIG. 19 is a block diagram of an engine control system of a tractor pulling a rotary plow implement.
Figure 20:
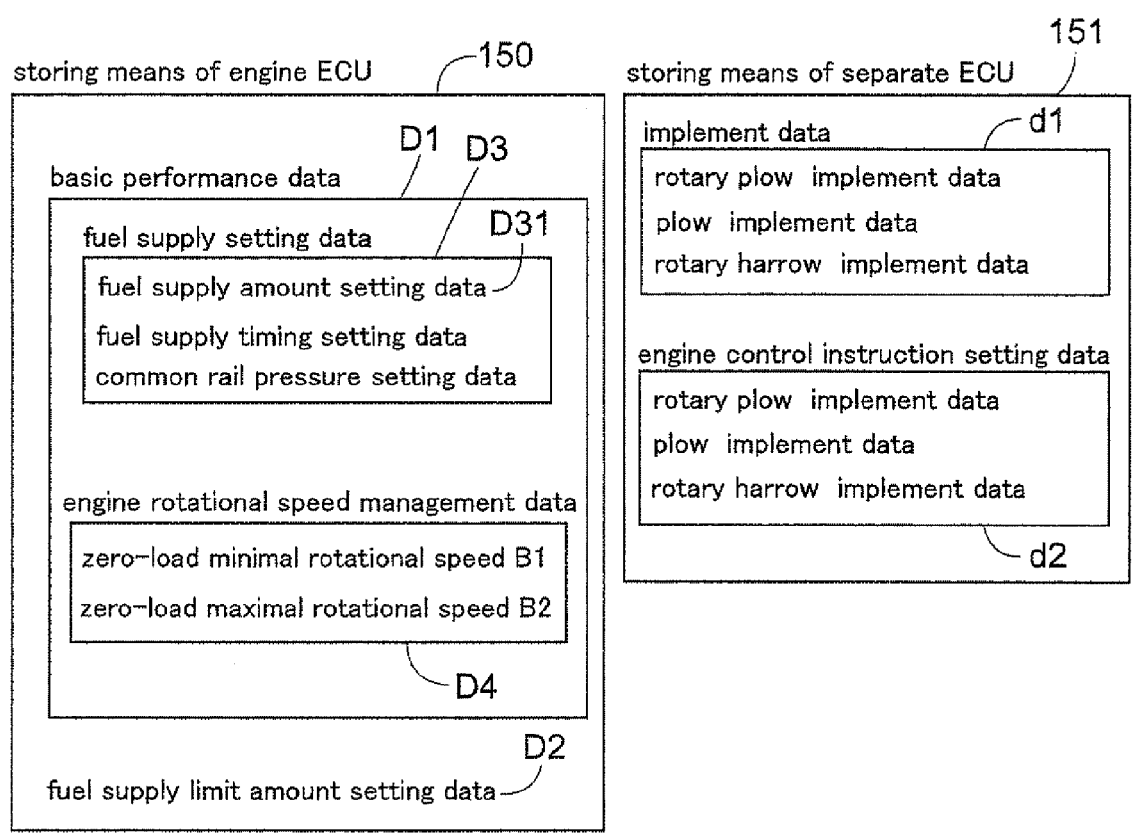
FIG. 20 is a view for explaining data stored respective memories of an engine control unit and a separate control unit of the control system shown in FIG. 19.
Figure 21:
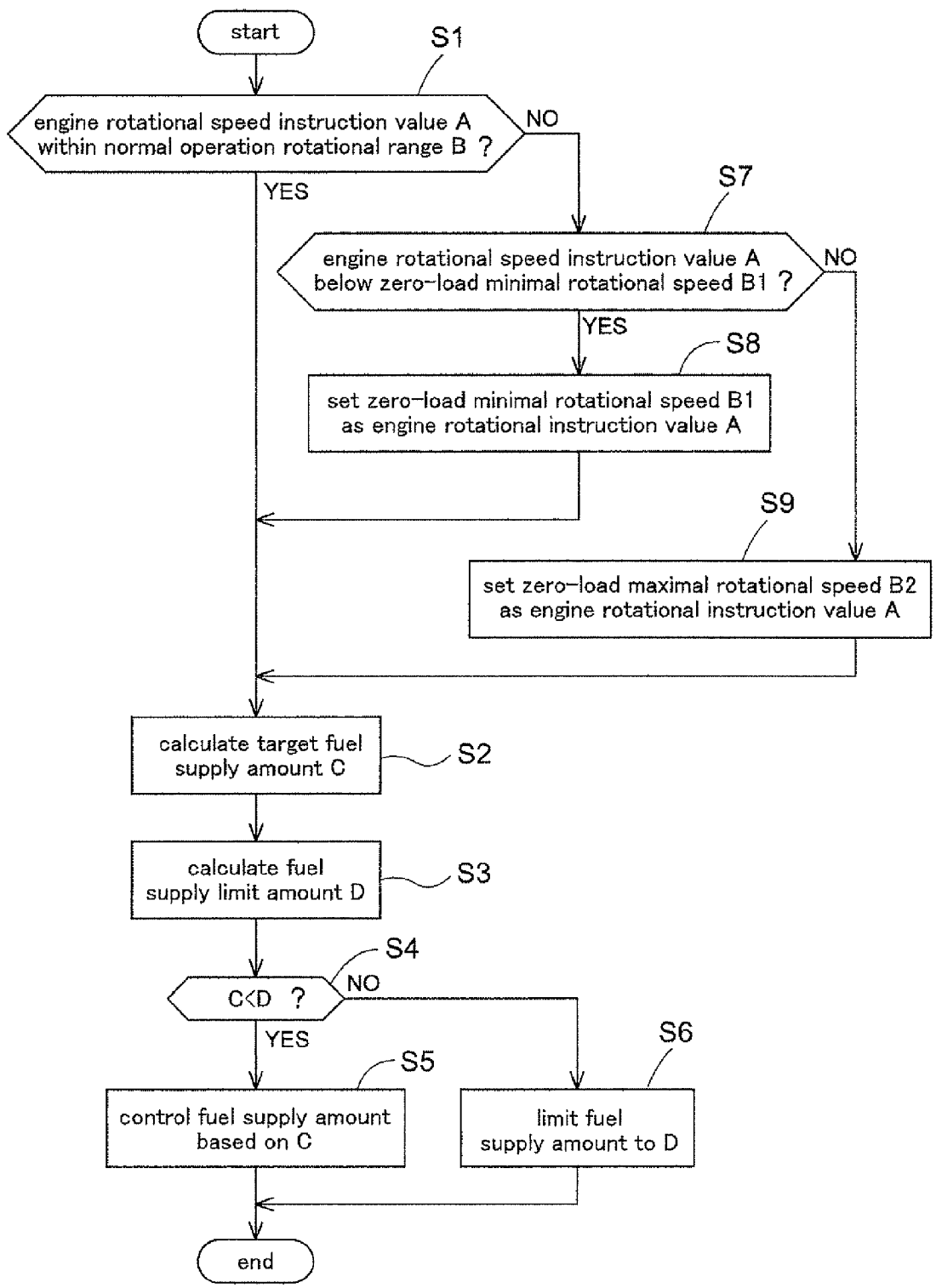
FIG. 21 is a flowchart illustrating a process for controlling a fuel supply amount by the engine control unit of the control system shown in FIG. 19.

An embodiment of the present invention will be described with reference to the accompanying drawings. FIGS. 19 through 21 are views illustrating an engine control system for a working machine according to one embodiment of the present invention. In this embodiment, there will be described an engine control system for an agricultural tractor pulling a rotary plowing implement.

As shown in FIG. 19, this engine control system is incorporated in a tractor including a traveling vehicle body 107 mounting a diesel engine E and a transmission case 108 thereon. The diesel engine E includes an engine fuel supplying device 105. This engine fuel supplying device 105 is a common rail type fuel injection device 109. Rearwardly of the transmission case 108, an implement 103 is provided. This implement 103 is a rotary plow implement 110. This rotary plow implement 110 is connected via a link mechanism 111 to the traveling vehicle body 107 and pulled by this traveling vehicle body 107 and lifted up/down by drive of a lift operation actuator 123. Power of the engine E is transmitted via the transmission case 108 to rear wheels 113 and the rotary plow implement 110. Numeral 114 in FIG. 19 denotes front wheels. With this engine control system for an agricultural tractor, the engine E is controlled according to the characteristics of the implement 103 driven by the engine E.

The construction of the rotary plow implement is as under.

As shown in FIG. 19, the rotary plow implement 110 includes a plowing section 115. The plowing section 115 includes a transmission case 116 disposed on one lateral side thereof; a pawl shaft 117 mounted between the transmission case 116 and a side frame (not shown) on the other lateral side; and a plowing pawl 118 mounted on the pawl shaft 117. The plowing section 115 is covered with a main cover 119 from the upper side thereof and covered with a rear cover 120 from the rear side thereof. The rear cover 120 is pivotally attached to the main cover 119 via a pivot portion 121. The rear cover 120 is placed on the ground surface. To the pivot portion 121 of the rear cover 120, there is attached actual plowing depth detecting means 122 for detecting a pivot angle of the rear cover 120.

The construction of the lift operating means of the rotary plow machine is as under.

As shown in FIG. 19, upwardly of the transmission case 108, there is disposed a lift operating actuator 123; and to a lift arm 124 of this lift operating actuator 123, a lower link 126 is operably connected via a lift rod 125. In association with a pivotal movement of the lift arm 124, the rotary plow implement 110 is lifted up/down. To the lift operating actuator 123, there is attached an actual lift position sensor 127 for detecting the pivot angle of the lift arm 127.

The control of the lift operating actuator is as under.

As shown in FIG. 19, the lift operating actuator 123 for lifting up/down the rotary plow implement 110 is controlled by a separate control unit Ha separate from the engine control unit He. To the separate control unit Ha, there are connected forcible lift operating means 128, target plowing depth setting means 129, the actual plowing depth detecting means 122 and the lift operating actuator 123. A memory 151 of the separate control unit Ha stores work data d1 and these work data d1 include a plurality of implement data including rotary implement data. In operation, when a target plowing depth is set by the target plowing depth setting means 129 and a forcible lowering operation is effected manually by the forcible lift operating means 128, the separate control unit Ha executes a feedback control for causing the actual plowing depth to automatically approach the target plowing depth by operating the lift operating actuator 123 based on the rotary plow implement data in the work data d1, thereby to lower the rotary implement 110 to a target lowered position. When a forcible elevating operation is effected by manual operation of the forcible lift operating means 128, the separate control unit Ha controls the lift operating actuator 123 to elevate the rotary plow implement 110 to a non-ground contacting position.

In case the implement 103 is a plow implement or a rotary harrow implement, the separate control unit Ha controls operations of the implement 103, based on the plow implement data or rotary harrow implement data.

The construction of the common rail type fuel injection device is as under.

This common rail fuel injection device 109 includes a fuel supply pump 130, a common rail 131 and a fuel injector 132. In operation, the fuel supply pump 130 supplies fuel in the fuel tank 132 to the common rail 131, and the fuel is accumulated in the common rail 131 and the fuel injector 132 injects this fuel into a combustion chamber (not shown).

The control construction of the common rail fuel injection device is as under.

Fuel supply to the common rail fuel injection device 109 is controlled by the engine control unit He.

As shown in FIG. 19, to this engine control unit He, there are connected accelerator position detecting means 133, actual engine rotational speed detecting means 134, crank angle discriminating means 135, cylinder discriminating means 136, an injection control valve 137 of the fuel injector 132 as well as actual rail pressure detecting means 138, and a delivery rate control valve 139 of the fuel supply pump 130.

The construction of the engine control system is as under.

The engine control unit He and the separate control unit Ha separate from the engine control unit He are interconnected via a data communication network TU. This data communication network TU is a CAN communication bus. The CAN communication bus is a data communication network for effecting data communication by the CAN (control area network) protocol. The control unit means an electronic control unit.

The engine control unit He is attached to the engine E and the separate control unit Ha is attached to a portion of the traveling vehicle body 107 (so-called machine, or main body) mounting the engine E, different from the position of the engine E. Each control unit He, Ha comprises an assembly mounting on a substrate, a controlling section (central processing unit), an EEPROM (electrically erasable, programmable, read-only memory), a flash memory, a RAM (random access memory), a CAN controller, an input interface, and an output interface.

As shown in FIG. 20, the flash memory of the engine control unit He, i.e. a memory 150, stores fuel supply amount setting data D31. This fuel supply amount data D31 is map data for calculating a target fuel supply amount: C of the engine fuel supplying device 105, from an instruction engine rotational speed: A to be described later and an instruction engine torque.

This fuel supply amount data D31 can alternatively be calculation formula data for calculating a target fuel supply amount: C of the engine fuel supplying device 105, from an instruction engine rotational speed: A and an instruction engine torque.

The flash memory of the separate control unit Ha, i.e. a memory 151, stores engine control instruction setting data d2 of control characteristics according to the working characteristics of the implement 103. These engine control instruction setting data d2 are map data for calculating the instruction engine rotational speed: A and the instruction engine torque, based on the control characteristics according to the working characteristics of the implement 103, from accelerator information and engine load, with these data being matched with each other. The engine load can be calculated from the accelerator position data and an actual engine rotational speed. The engine load can be detected also by a strain gauge attached to the crank shaft.

The engine control instruction setting data d2 can alternatively calculation formula data for calculating the instruction engine rotational speed: A and the instruction engine torque, based on the control characteristics according to the working characteristics of the implement 103, from accelerator information and engine load.

The engine control instruction setting data d2 includes a plurality of implement data including the rotary plow implement data. In this embodiment, the implement 103 is the rotary plow implement. Therefore, the separate control unit Ha calculates the instruction engine rotational speed: A and the instruction engine torque, based on the rotary plow implement data in the engine control instruction setting data d2.

In case the implement 103 is a plow implement or a rotary harrow implement, the separate control unit Ha will calculates the instruction engine rotational speed: A and the instruction engine torque, based on the plow implement data or rotary harrow implement data in the engine control instruction setting data d2.

The control characteristics according to the working characteristics of the implement 103 means e.g. control characteristics for obtaining a high torque over a wide range of engine rotational speed to restrict occurrence of engine stop in the case of a work of large load variation, or for reducing rotational speed variation due to load variation in order to improve working efficiency in the case of a work of small load variation, or for reducing the engine rotational speed prior to engagement of a power transmission clutch between the engine and the implement, in order to lessens the engagement shock, etc.

The procedure of controlling of the fuel supply amount of the common rail fuel injection device is as under.

When the engine control unit He transmits accelerator position information and actual engine rotational speed information to the separate control unit Ha, based on these information and the rotary plow implement data in the engine control instruction setting data d2, the separate control unit Ha calculates the instruction engine rotational speed: A and the instruction engine torque; and the separate control unit Ha transmits these instruction information to the engine control unit He.

Alternatively, the engine control unit He retrieves the engine control instruction setting data d2, and the engine control unit He may calculate the instruction engine rotational speed: A and the instruction engine torque, based upon the accelerator position information, the actual engine rotational speed information and the rotary plow implement data in the engine control instruction setting data d2.

And, the engine control unit He calculates a target fuel supply amount: C of the engine fuel supplying device 105, based on the above instruction information and the fuel supply amount setting data D31; and based on this target fuel supply amount: C, the engine control unit He calculates a fuel supply amount of the engine fuel supplying device 105.

The control of the fuel supply amount is effected by adjusting the valve opening period of the injection control valve 137 of the fuel injector 132, thus adjusting the fuel injection period.

The data stored in the memory of the engine control unit are as under. The memory 150 of the engine control unit He stores basic performance data D1 and fuel supply limit amount setting data D2. The basic performance data D1 includes fuel supply setting data D3 and engine rotational speed managing data D4. The fuel supply setting data D3 includes fuel supply amount setting data, fuel supply timing setting data and common rail pressure setting data. These data are map data. But, these can be calculation formula data also. The engine rotational speed managing data D4 includes a zero-load minimal rotational speed: B1 and a zero-load maximal rotational speed: B2.

The control of the engine control section based upon the above-described data is as under.

The engine control unit He controls the fuel supply timing of the engine fuel supplying device 105, based on the instruction information and the fuel supply timing setting data, and controls the common rail pressure, based on the instruction information and the common rail pressure setting data. Controlling of the fuel supply timing is effected by controlling the opening timing of the injection control valve 137 of the fuel injector 132, and controlling of the common rail pressure is effected by controlling the delivery rate control valve 139 of the fuel supply pump 130.

The procedure of the control operation of the fuel supply amount by the engine control unit is as under.

As shown in FIG. 21, at step (S1), the process determines whether the instruction engine rotational speed: A is within the normal rotational speed range: B or not. If YES, then, at step (S2), based on this instruction engine rotational speed: A, the instruction engine torque and the fuel supply amount setting data D31, the target fuel supply amount: C for the engine fuel supplying device 105 is calculated. And, at step (S3), based on the instruction engine rotational speed: A and the fuel supply limit amount setting data D2, the fuel supply limit about: D of the engine fuel supplying device 105 is calculated. And, at step (S4), the process determines whether the target fuel supply amount: C is below the fuel supply limit amount D or not. If YES, at step (S5), based on the target fuel supply amount: C, controlling of the fuel supply amount of the engine fuel supplying device 105 is effected. If NO, then, at step (S6), control is effected for limiting the fuel supply amount of the engine fuel supplying device 105 to the fuel supply limit amount: D.

If NO in the determination at step (S1), then, at step (S7), the process determines whether the engine rotational speed instruction value: A is the zero-load minimal rotational speed: B1 or not. If YES, then, at step (S8), this zero-load minimal rotational speed: B1 is set as the instruction engine rotational speed: A and then, the process effects the controlling of the fuel supply amount of the engine fuel supplying device 105 at steps (S2) through (S6). If NO in the determination at step (S', at step (S9), the zero-load maximal rotational speed: B2 is set as the instruction engine rotational speed: A, and then, the process effects the controlling of the fuel supply amount of the engine fuel supplying device 105 at steps (S2) through (S6).

Thus, the technical features of the above-described engine control system will be as under:-
(Feature 1)

As shown in FIG. 19, the engine E is controlled according to the working characteristics of the implement 103. In the engine control system for a working machine, the engine control unit He and the separate control unit Ha separate from this engine control unit He are interconnected via the data communication network TU. As shown in FIG. 20, the memory 150 of the engine control unit He stores the fuel supply amount setting data D31, and the memory 151 of the separate control unit Ha stores the engine control instruction setting data d2 of the control characteristics according to the working characteristics of the implement 103. The separate control unit Ha or the engine control unit He calculates the instruction engine rotational speed: A and the instruction engine torque, based upon the engine control instruction setting data d2. And, as shown in FIG. 21, the engine control unit He calculates the target fuel supply amount: C of the engine fuel supplying device 105, based on these instruction information and the fuel supply amount setting data D31, and the engine control unit He controls the fuel supply amount of the engine fuel supplying device 105, based on this target fuel supply amount: C.

(Effect of Feature 1)

The general versatility of the engine control unit can be enhanced. That is, as shown in FIG. 20, since the memory 151 of the separate control unit is caused to store the engine control instruction setting data d2 according to the working characteristics of the implement 103, there is no need to cause the memory 150 of the engine control unit He to store the engine control instruction setting data d2. So, it is possible to manufacture an engine control unit He not limited to the kind of the implement 103, so that the general versatility of the engine control unit can be enhanced.

(Feature 2)

The memory 150 of the engine control unit He stores the fuel supply limit amount setting data D2 and the engine control unit He calculates the fuel supply limit amount: D of the engine fuel supplying device 105, based on the instruction engine rotational speed: A and the fuel supply limit amount setting data D2. And, if the target fuel supply amount: C is below the fuel supply limit amount: D, the engine control unit. He effects the control of the fuel supply amount of the engine fuel supplying device 105 based on the target fuel supply amount: C. Whereas, if the amount: C is equals to or greater than the fuel supply limit amount: D, the engine control unit He effects the control for limiting the fuel supply amount of the engine fuel supplying device 105 to the fuel supply limit amount: D. As shown in FIG. 20, the memory 150 of the engine control unit He stores the fuel supply amount limit setting data D2. And, as shown in FIG. 21, the engine control unit He limits the fuel supply exceeding the fuel supply limit amount: D based on the fuel supply limit amount setting data D2. Therefore, regardless of the kind of the implement 103, the management of exhaust gas regulation can be done all by the engine control unit He.

(Effect of Feature 2)

Regardless of the kind of the implement 103, the management of exhaust gas regulation can be done all by the engine control unit He. The engine control instruction setting data of the separate control unit can be freely set within the range below the fuel supply limit amount based on the fuel supply limit amount setting data of the engine control unit. As shown in FIG. 21, if the target fuel supply amount: C is below the fuel supply limit amount: D, the engine control unit He effects the fuel supply amount of the engine fuel supplying device 105, based on the target fuel supply amount: C. Therefore, the engine control instruction setting data d2 of the separate control unit Ha, used as the basis for the calculation of the target fuel supply amount: C, can be freely set within the range below the fuel supply limit amount: D based on the fuel supply limit amount setting data D2 of the engine control unit He.

(Feature 3)

The memory 150 of the engine control unit He stores the zero-load minimal rotational speed: B1 and the zero-load maximal rotational speed: B2, and when the instruction engine rotational speed: A is within the normal operation rotational range: B ranging from zero-load minimal rotational speed: B1 to the zero-load maximal rotational speed: B2, the engine control unit He effects the control of the fuel supply amount of the engine fuel supplying device 105 based on this instruction engine rotational speed: A.

Whereas, if the instruction engine rotational speed: A is below the zero-load minimal rotational speed: B1, the engine control unit He effects the control of the fuel supply amount of the engine fuel supplying device 105 with setting the zero-load minimal rotational speed: B1 as the instruction engine rotational speed: A.

Whereas, if the instruction engine rotational speed: A exceeds the zero-load maximal rotational speed: B2, the engine control unit He effects the control of the fuel supply amount of the engine fuel supplying device 105 with setting the zero-load maximal rotational speed: B2 as the instruction engine rotational speed: A.

(Effect of Feature 3)

The engine control unit can manage the principal basic performances of the engine. As shown in FIG. 20, the memory 150 of the engine control unit He stores the zero-load minimal rotational speed: B1 and the zero-load maximal rotational speed: B2, and based on these, the engine control unit He effects the upper/lower limit rotational speed management of the normal operational rotational speed range: B. Therefore, the engine control unit He can manage the principal basic performances of the engine.

The above-described engine control system is applicable not only as the engine control system for a tractor having a vehicle body to which a rotary plow implement is connected to be pulled thereby, but also an engine control system for an agricultural tractor connecting and pulling other kinds of implements (plow implement, a rotary harrow implement, etc.), an engine control system for an agricultural implement such as a combine having a harvester and a thresher mounted on a vehicle body, an engine control system for a construction implement such as a backhoe, having a bucket implement connected to the vehicle body, an engine control system for an engine-driven electricity generator having a generator mounted on a machine body, etc. The engine fuel supplying device 105 is not limited to the common rail type fuel injection device 109, but can be an electronic governor for controlling a fuel injection pump and its fuel amount adjustment rack position. The data communication network is not limited to the CAN communication bus, but can be any other data communication network.

The invention claimed is:

1. A control system for an engine (E) of a working machine, for controlling the engine according to working characteristics of an implement driven by the engine,
wherein an engine control unit (He) and a separate control unit separate from said engine control unit are interconnected via a data communication network;
a memory of said engine control unit stores fuel supply amount setting data and a memory of said separate control unit stores engine control instruction setting data of control characteristics according to the working characteristics of the implement;
said separate control unit or said engine control unit calculates instruction information comprising an instruction engine rotational speed (A) and an instruction engine torque, based upon said engine control instruction setting data;
said engine control unit (He) calculates a target fuel supply amount (C) of an engine fuel supplying device based on said instruction information and said fuel supply amount setting data, and said engine control unit controls a fuel supply amount of the engine fuel supplying device, based on said target fuel supply amount (C).

2. The control system for an engine according to claim 1, wherein the memory of said engine control unit stores fuel supply limit amount data;
said engine control unit calculates a fuel supply limit amount (D) of the engine fuel supplying device based on the instruction engine rotational speed (A) and said fuel supply limit amount setting data;
when said target fuel supply amount (C) is below said fuel supply limit amount (D), said engine control unit controls the fuel supply amount of the engine fuel supplying device based on said target fuel supply amount (C); and
when said target fuel supply amount (C) equals to or exceeds said fuel supply limit amount (D), said engine control unit effects control for limiting the fuel supply amount of the engine fuel supplying device to said fuel supply limit amount (D).

3. The control system for an engine according to claim 1, wherein the memory of the engine control unit stores a zero-load minimal rotational speed (B1) and a zero-load maximal rotational speed (B2);
when said instruction engine rotational speed (A) is within a normal operation rotational speed range ranging from said zero-load minimal rotational speed (B1) to said zero-load maximal rotational speed (B2), said engine control unit controls the fuel supply amount of the engine fuel supplying device based on said instruction engine rotational speed (A);
when said instruction engine rotational speed (A) is below said zero-load minimal rotational speed (B1), said engine control unit effects the control of the fuel supply mount of the engine fuel supplying device, with setting the zero-load minimal rotational speed (B1) as the instruction engine rotational speed (A); and
when said instruction engine rotational speed (A) exceeds said zero-load maximal rotational speed (B2), said engine control unit effects the control of the fuel supply mount of the engine fuel supplying device, with setting the zero-load maximal rotational speed (B2) as the instruction engine rotational speed (A).

* * * * *

UNITED STATES PATENT AND TRADEMARK OFFICE
CERTIFICATE OF CORRECTION

PATENT NO. : 8,417,424 B2
APPLICATION NO. : 12/532536
DATED : April 9, 2013
INVENTOR(S) : Yasuo Fujii et al.

It is certified that error appears in the above-identified patent and that said Letters Patent is hereby corrected as shown below:

On the Title Page

Item (75) Inventors, Line 4, delete "Yukifum" and insert -- Yukifumi --

The first or sole Notice should read --

Subject to any disclaimer, the term of this patent is extended or adjusted under 35 U.S.C. 154(b) by 426 days.

In the Claims

Column 30, Line 44, Claim 3, delete "mount" and insert -- amount --

Column 30, Line 50, Claim 3, delete "mount" and insert -- amount --

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,417,424 B2
APPLICATION NO. : 12/532536
DATED             : April 9, 2013
INVENTOR(S)       : Fujii et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this
First Day of September, 2015

Michelle K. Lee
*Director of the United States Patent and Trademark Office*